US012764594B2

(12) United States Patent
Kim et al.

(10) Patent No.: US 12,764,594 B2
(45) Date of Patent: Oct. 13, 2026

(54) METHOD AND DEVICE FOR MAPPING UE ROUTING SELECTION POLICY IN WIRELESS COMMUNICATION SYSTEM

(71) Applicant: Samsung Electronics Co., Ltd., Suwon-si (KR)

(72) Inventors: Dongyeon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/730,132

(22) PCT Filed: Jan. 20, 2023

(86) PCT No.: PCT/KR2023/001060
§ 371 (c)(1),
(2) Date: Jul. 18, 2024

(87) PCT Pub. No.: WO2023/140704
PCT Pub. Date: Jul. 27, 2023

(65) Prior Publication Data

US 2025/0150888 A1 May 8, 2025

(30) Foreign Application Priority Data

Jan. 21, 2022 (KR) ........................ 10-2022-0009028

(51) Int. Cl.
*H04W 28/02* (2009.01)
*H04L 47/20* (2022.01)
(Continued)

(52) U.S. Cl.
CPC ......... *H04W 28/0263* (2013.01); *H04L 47/20* (2013.01); *H04W 40/246* (2013.01); *H04W 60/00* (2013.01)

(58) Field of Classification Search
CPC ..... H04W 48/18; H04W 76/12; H04W 76/11; H04W 28/0268; H04W 40/02;
(Continued)

(56) References Cited

U.S. PATENT DOCUMENTS 10,652,942 B2 * 5/2020 Castellanos Zamora .................... H04W 76/10
11,606,303 B1 * 3/2023 Jagannatha ......... H04L 47/2475
(Continued)

FOREIGN PATENT DOCUMENTS

KR 10-2021-0030771 3/2021
KR 10-2021-0088233 7/2021
(Continued)

OTHER PUBLICATIONS

Technical White Paper—Network Slicing (Year: 2020).*
(Continued)

*Primary Examiner* — Dung Hong
(74) *Attorney, Agent, or Firm* — Jefferson IP Law, LLP

(57) ABSTRACT

The present disclosure relates to a 5G or 6G communication system for supporting higher data transmission rates, and pertains to an operation method of a user equipment (UE). The operation method comprises the steps of transmitting a registration request message including a traffic category support indication to an access and mobility management function (AMF) via an access node, receiving, from the AMF via the access node, a UE configuration update message including UE route selection policy (URSP) rules determined on the basis of the traffic category support indication and first traffic category mapping information, and determining a protocol data unit (PDU) session for application traffic on the basis of the URSP rules and pre-stored second traffic category mapping information.

15 Claims, 24 Drawing Sheets

(51) Int. Cl.
*H04W 40/24* (2009.01)
*H04W 60/00* (2009.01)

(58) Field of Classification Search
CPC ........... H04W 28/0263; H04W 40/246; H04W 60/00; H04L 47/20
See application file for complete search history.

(56) References Cited

U.S. PATENT DOCUMENTS

| | | | | |
|---|---|---|---|---|
| 11,696,208 | B1 * | 7/2023 | Manning | H04W 40/12 370/329 |
| 12,041,135 | B2 * | 7/2024 | Sun | H04L 67/141 |
| 2020/0187085 | A1 * | 6/2020 | Jagannatha | H04L 41/5041 |
| 2020/0221376 | A1 * | 7/2020 | Li | H04W 48/16 |
| 2021/0160186 | A1 * | 5/2021 | Xu | H04L 47/20 |
| 2022/0141713 | A1 * | 5/2022 | Jagannatha | H04W 48/17 370/328 |
| 2022/0264370 | A1 * | 8/2022 | Qiao | H04W 60/00 |
| 2022/0386100 | A1 * | 12/2022 | Lee | H04W 28/02 |
| 2023/0037685 | A1 * | 2/2023 | Han | H04L 41/0894 |
| 2023/0068189 | A1 * | 3/2023 | Xu | H04W 28/0268 |
| 2023/0097726 | A1 * | 3/2023 | Park | H04W 28/0263 370/392 |
| 2023/0113519 | A1 * | 4/2023 | Fernandez Alonso | H04W 76/11 370/329 |
| 2023/0337105 | A1 * | 10/2023 | Manning | H04W 40/12 |

FOREIGN PATENT DOCUMENTS

| | | | |
|---|---|---|---|
| KR | 10-2317374 | B1 | 10/2021 |
| KR | 10-2022-0005647 | | 1/2022 |

OTHER PUBLICATIONS

Policy Control Function Cloud Native—User's Guide (Year: 2020).*
On the Rollout of Network Slicing in Carrier Networks: A Technology Radar (Year: 2021).*
3GPP TS 23.503 version 16.5.0 release 16 (Year: 2020).*
5G and Wi-Fi RAN Convergence (Year: 2021).*
3rd Generation Partnership Project; Technical Specification Group Services and System Aspects; Policy and charging control framework for the 5G System (5GS); Stage 2 (Release 17), 3GPP TS 23.503 V17.3.0 (Dec. 2021), Dec. 23, 2021.
3rd Generation Partnership Project; Technical Specification Group Services and System Aspects; Procedures for the 5G System (5GS); Stage 2 (Release 17), 3GPP TS 23.502 V17.3.0 (Dec. 2021), Dec. 23, 2021.
International Search Report dated Apr. 5, 2023, issued in International Application No. PCT/KR2023/001060.

* cited by examiner

CONTINUE

METHOD AND DEVICE FOR MAPPING UE ROUTING SELECTION POLICY IN WIRELESS COMMUNICATION SYSTEM

CROSS-REFERENCE TO RELATED APPLICATION(S)

This application is a U.S. National Stage application under 35 U.S.C. § 371 of an International application number PCT/KR2023/001060, filed on Jan. 20, 2023, which is based on and claims priority of a Korean patent application number 10-2022-0009028, filed on Jan. 21, 2022, in the Korean Intellectual Property Office, the disclosure of which is incorporated by reference herein in its entirety.

TECHNICAL FIELD

The disclosure relates to a method and a device for mapping a terminal routing selection policy (UE route selection policy (URSP)) of a terminal in a wireless communication system or a mobile communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

In the initial stage of 5G mobile communication technologies, in order to support services and to satisfy performance requirements in connection with enhanced Mobile BroadBand (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is unavailable, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), etc., 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

Technical Problem

In a 5G system, a network provides a UE route selection policy (URSP) to a UE so that application traffic of the UE may be transmitted and received via an appropriate PDU session.

The URSP may include one or more URSP rules, and the URSP rules may include a traffic descriptor (TD) and route selection components (RSCs). When the UE detects an application or application traffic corresponding to the traffic descriptor, the UE may associate the application traffic with a previously generated (or established) PDU session. Alternatively, if there is no PDU session that satisfies RSCs of the previously generated PDU session, the UE may establish a new PDU session.

When the traffic descriptor received from the network includes an application descriptor which enables application identification, the UE may associate, with the PDU session, the application or application traffic that the UE has detected using the application descriptor. In this case, the application descriptor may include an operating system ID (OS ID) and an operating system application ID (OS App ID), and OS ID and OS App ID values may be uniquely defined in an OS.

In the current 5G system, when the traffic descriptor received from the network by the UE is written based on the application descriptor including the OS ID and OS App ID uniquely defined in the OS, if the OS does not transfer the OS ID and/or the OS App ID to a UE module that performs an operation of associating, with the PDU session, the application or application traffic detected by the UE, there is a problem that the application or application traffic cannot be associated with the PDU session.

Therefore, the disclosure provides a method and a device of, in configuration of a traffic descriptor of a URSP, using, instead of an application identifier uniquely defined by an internal module of a UE, another traffic descriptor component which may associate an application or application traffic of the UE with a PDU session.

Technical Solution

An operation method of a terminal (user equipment (UE)) in a wireless communication system according to the disclosure includes: transmitting a registration request message including a traffic category support indication to an access and mobility management function (AMF) via an access node; receiving, from the AMF via the access node, a UE configuration update message including UE route selection policy (URSP) rules determined based on the traffic category support indication and first traffic category mapping information; and determining a protocol data unit (PDU) session for application traffic, based on the URSP rules and prestored second traffic category mapping information.

In response to the registration request message, a UE policy associate create request message including the traffic category support indication may be transmitted from the AMF to a PCF.

In response to the UE policy associate create request message, a DM query request message may be transmitted from the PCF to a UDR. In response to the DM query request message, a DM query response message including the first traffic category mapping information may be transmitted from the UDR to the PCF.

In response to the DM query response message, a DM subscription message including the traffic category support indication and the first traffic category mapping information may be transmitted from the PCF to the UDR.

The URSP rules may be determined by the PCF, based on the first traffic category mapping information.

An N1N2message transfer message including the URSP rules may be transmitted from the PCF to the AMF.

The UE configuration update message may be received from the AMF via the access node in response to the N1N2message transfer message.

The determining of the PDU session may include: storing the URSP rules; and detecting the application traffic.

The determining of the PDU session may further include determining a traffic category corresponding to the detected application, based on the second traffic category mapping information.

The determining of the PDU session may further include: determining at least one URSP rule corresponding to the determined traffic category, based on the URSP rules; and determining an internal connection interface and the PDU session for the application traffic, based on the at least one URSP rule.

The operation method may further include: transmitting, to the AMF via the access node, a request message for requesting establishment of the PDU session; and receiving a response message to the request message from the AMF via the access node.

The traffic category support indication may indicate that the terminal detects at least one application traffic, based on a traffic category indicated by at least one of the first traffic category mapping information and the second traffic category mapping information.

The first traffic category mapping information may be determined by a PCF based on network configuration information, may be transmitted from the PCF to the AMF, and may indicate a route selection component (RSC) and an application corresponding to each of multiple traffic categories.

The second traffic category mapping information may be determined by the terminal, based on UE configuration information received from the AMF via the access node, and may indicate a route selection component and an application corresponding to each of multiple traffic categories.

An operation method of a terminal (user equipment (UE)) in a wireless communication system according to the disclosure includes: transmitting a registration request message including a traffic category support indication to an access and mobility management function (AMF) via an access node; receiving, from the AMF via the access node, a UE configuration update message including traffic category mapping information and UE route selection policy (URSP) rules determined based on the traffic category support indication; and determining a protocol data unit (PDU) session for application traffic, based on the URSP rules and the traffic category mapping information.

The traffic category mapping information may be determined by a network entity of the wireless communication system, based on operator configuration information, and may indicate a route selection component (RSC) and an application corresponding to each of multiple traffic categories.

The traffic category mapping information may be determined by an AF, based on third-party operator configuration information, and may indicate a route selection component (RSC) and an application corresponding to each of multiple traffic categories.

The traffic category mapping information determined by the AF may be transmitted from the AF to a UDM, and may be authenticated by the UDM.

A message indicating a result authenticated by the UDM may be transmitted from the UDM to a UDR, and in response to the message indicating the result authenticated by the UDM, the authenticated traffic category mapping information may be transmitted from the UDR to a PCF.

The URSP rules may be determined by the PCF, based on the authenticated traffic category mapping information, and may be transmitted from the PCF to the AMF.

Advantageous Effects

According to a device and a method according to various embodiments of the disclosure, an application or application traffic detected by a UE can be associated with an appropriate PDU session, based on a URSP configured using application classification information provided by a network.

In addition, advantageous effects obtainable from the disclosure may not be limited to the above-mentioned effects, and other effects which are not mentioned may be clearly understood, through the following descriptions, by those skilled in the art to which the disclosure pertains.

MODE FOR INVENTION

Figure 1:
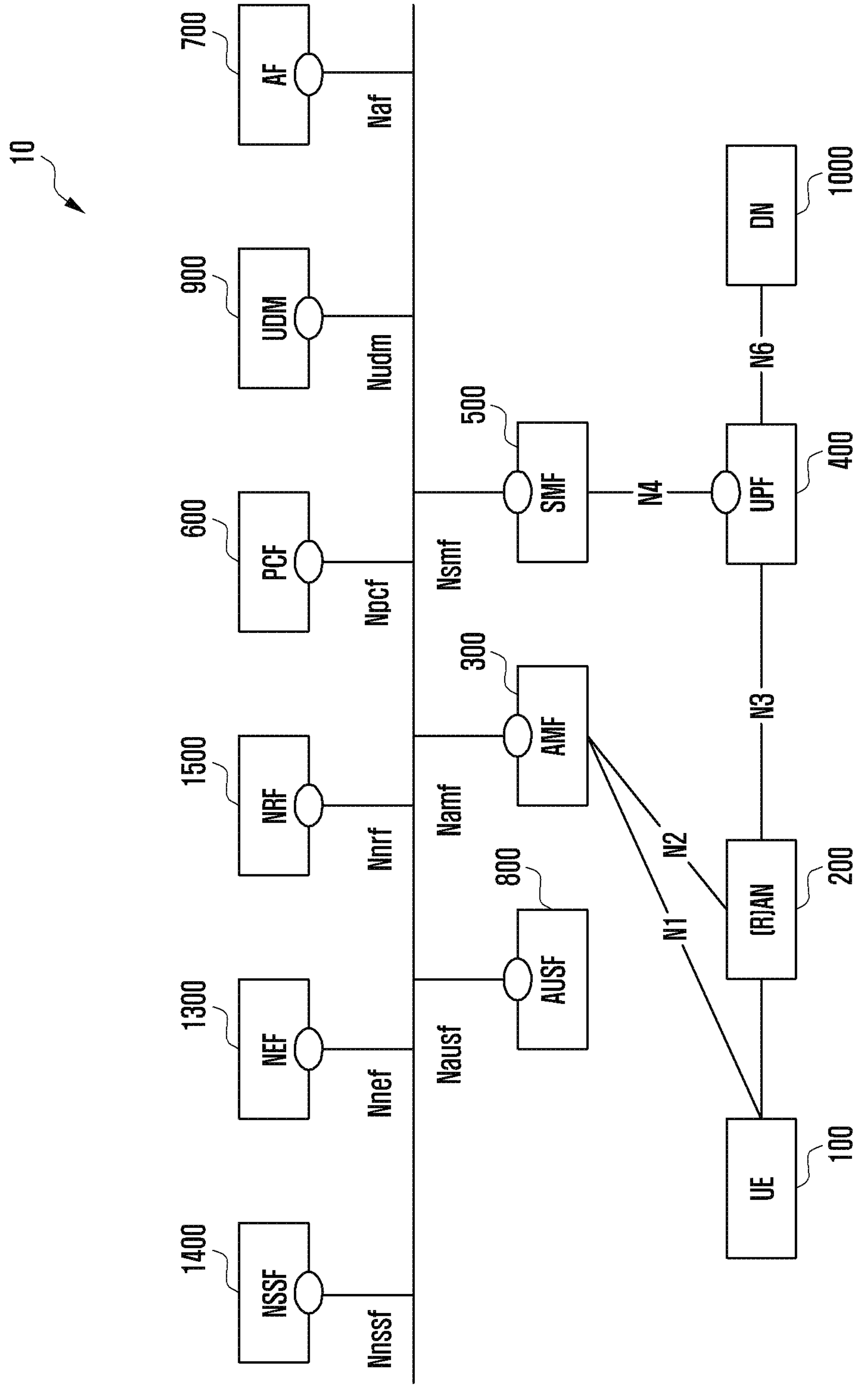
FIG. 1 is a diagram illustrating a network structure and interfaces for a 5G system according to the disclosure.

Hereinafter, exemplary embodiments of the disclosure will be described in detail in conjunction with the accompanying drawings. It should be noted that, in the accompanying drawings, the same or like elements are designated by the same or like reference signs as much as possible. Also, it should be noted that the following accompanying drawings of the disclosure are provided to assist in understanding the disclosure, and the disclosure is not limited to the forms or configurations illustrated in the drawings of the disclosure. Also, a detailed description of known functions or configurations that may make the subject matter of the disclosure unnecessarily unclear will be omitted. It should be noted that in the following description of the disclosure, only parts necessary for understanding operations according to various embodiments of the disclosure will be described and descriptions of the other parts will be omitted so as not to make the subject matter of the disclosure obscure. Furthermore, various embodiments of the disclosure will be described using terms used in some communication standards (e.g., the 3rd generation partnership project (3GPP)), but they are for illustrative purposes only. Various embodiments of the disclosure may be easily applied to other communication systems through modifications.

FIG. 1 is a diagram illustrating a network structure and interfaces for a 5G system 10 according to the disclosure.

A network entity included in the network structure of the 5G system 10 of FIG. 1 may include a network function (NF) depending on system implementation.

Referring to FIG. 1, the network structure of the 5G system 10 may include various network entities. For example, the 5G system 10 may include an authentication server function (AUSF) 800, a (core) access and mobility management function (AMF) 300, a session management function (SMF) 500, a policy control function (PCF) 600, an application function (AF) 700, a unified data management (UDM) 900, a data network (DN) 1000, a network exposure function (NEF) 1300, a network slicing selection function (NSSF) 1400, an edge application service domain repository (EDR, not illustrated), an edge application server (EAS, not illustrated), an EAS discovery function (EASDF, not illustrated), a user plane function (UPF) 400, a (radio) access network ((R)AN) 200, and a UE, i.e., the user equipment (UE) 100.

The respective NFs of the 5G system 10 support the following functions.

The AUSF 800 processes and stores data for authentication of the UE 100.

The AMF 300 may provide a function for access and mobility management on each UE basis, and basically one UE 110 may be connected to one AMF. Specifically, the AMF 300 supports functions, such as signaling between CN nodes for mobility between 3GPP access networks, termination of a radio access network (RAN) CP interface (i.e., N2 interface), termination (N1) of non-access stratum (NAS) signaling, NAS signaling security (NAS ciphering and integrity protection), AS security control, registration management (registration area management), connection management, idle mode UE reachability (including control and execution of paging retransmission), mobility management control (subscription and policy), intra-system mobility and inter-system mobility support, support of network slicing, SMF selection, lawful interception (for an AMF event and an interface to an LI system), provision of transfer of a session management (SM) message between a UE and an SMF, a transparent proxy for SM message routing, access authentication, access authorization including a roaming right check, provision of transfer of an SMS message between a UE and an SMSF, a security anchor function (SEA) and/or security context management (SCM). Some or all of the functions of the AMF 300 may be supported within a single instance of one AMF.

The DN 1000 refers to, for example, an operator service, Internet access, a third-party service, or the like. The DN 1000 transmits a downlink protocol data unit (PDU) to the UPF 400, or receives, from the UPF 400, a PDU transmitted by the UE 100.

The PCF 600 receives information on a packet flow from an application server, and provides a function of determining policies, such as mobility management and session management. Specifically, the PCF 600 supports functions, such as support of a unified policy framework for controlling a network operation, provision of a policy rule so that a control plane function(s) (e.g., AMF or SMF) may execute a policy rule, and implementation of a front end for accessing related subscription information in order to determine a policy within a user data repository (UDR).

The SMF 500 may provide a session management function and may be managed by a different SMF for each session when the UE has multiple sessions. Specifically, the SMF 500 supports functions, such as session management (e.g., session establishment, modification, and release including the maintenance of a tunnel between the UPF 104 and the (R)AN 102 node), UE IP address assignment and management (optionally including authentication), selection and control of a UP function, configuration of traffic steering for routing traffic from the UPF 104 to a proper destination, termination of an interface toward policy control functions, execution of a control part of a quality of service (QoS) and a policy, lawful interception (for an SM event and an interface to an LI system), termination of the SM part of an NAS message, downlink data notification, an initiator of AN-specific SM information (transferred to the (R)AN 200 through N2 via the AMF 103), determination of an SSC mode of a session, and a roaming function. Some or all of the functions of the SMF 500 may be supported within a single instance of one SMF.

The UDM 900 stores subscription data of a user, policy data, etc. The UDM 900 includes two parts, that is, an application front end (FE) (not illustrated) and user data repository (UDR) (not illustrated).

The FE includes a PCF responsible for policy control and a UDM FE responsible for processing credential, subscription management, location management, etc. The UDR stores data required for functions provided by the UDM-FE and a policy profile required by the PCF. Data stored in the UDR includes policy data and user subscription data including a subscription ID, security credential, access and mobility-related subscription data, and session-related subscription data. The UDM-FE supports functions, such as access to subscription information stored in the UDR, authentication credential processing, user identification handling, access authentication, registration/mobility management, subscription management, and SMS management.

The UPF 400 may transfer a downlink PDU, which is received from the DN 1000, to the UE 100 via the (R)AN 200 and transfers an uplink PDU, which is received from the UE 100, to the DN 1000 via the (R)AN 200. Specifically, the UPF 400 supports functions, such as an anchor point for intra/inter RAT mobility, an external PDU session point of interconnection to a data network, packet routing and forwarding, a user plane part for packet inspection and policy rule execution, lawful interception, traffic usage reporting, an uplink classifier for supporting routing of a traffic flow to a data network, a branching point for supporting a multi-home PDU session, QoS handling (e.g., packet filtering, gating, and uplink/downlink rate execution) for a user plane, uplink traffic verification (service data flow (SDF) mapping between an SDF and a QoS flow), transport level packet marking within the uplink and downlink, downlink packet buffering, and a downlink data notification triggering function. Some or all of the functions of the UPF 400 may be supported within a single instance of one UPF.

The AF 700 interworks with a 3GPP core network in order to provide services (e.g., supporting functions, such as an application influence on traffic routing, network capability exposure access, and an interworking with a policy framework for policy control).

The (R)AN 200 collectively refers to a new radio access network supporting both an evolved E-UTRA and new radio (NR) access technologies (e.g., gNB) which are advanced versions of the 4G radio access technology.

The gNB supports functions, such as radio resource management (i.e., radio bearer control, radio admission control, connection mobility control, and dynamic allocation (i.e., scheduling) of resources to the UE 100 in an uplink/downlink), Internet protocol (IP) header compression, encryption and integrity protection of a user data stream, selection of the AMF 300 upon attachment of the UE 100 when routing to the AMF 300 has not been determined based on information provided to the UE 100, user plane data routing to the UPF(s) 400, control plane information routing to the AMF 300, connection setup and release, paging message scheduling and transmission (generated from the AMF 300), system broadcast information scheduling and transmission (generated from the AMF 300 or operation and maintenance (O&M)), measurement and measurement report configuration for mobility and scheduling, transport level packet marking in the uplink, session management, support of network slicing, QoS flow management and mapping to a data radio bearer, support of the UE that is in an inactive mode, a distribution function of an NAS message, an NAS node selection function, radio access network sharing, dual connectivity, and tight interworking between the NR and the E-UTRA.

The UE 100 refers to a user equipment. A user equipment may be referred to by terms, such as terminal, mobile equipment (ME), or mobile station (MS). In addition, the user equipment may be a portable device, such as a laptop, a mobile phone, a personal digital assistant (PDA), a smart phone, or a multimedia device, or may be a non-portable device, such as a personal computer (PC) or a vehicle-mounted device.

The NEF 1100 provides means for safely exposing services and capabilities provided by 3GPP network functions, for example, for a third party, internal exposure/re-exposure, an application function, and edge computing. The NEF 1100 receives information from other NF(s) (based on the exposed capability (capabilities) of other NF(s)). As a data storage network function, the NEF 1100 may store information received as structured data by using a standardized interface. The stored information may be re-exposed to other NF(s) and AF(s) by the NEF 1100, and may be used for other purposes, such as analysis.

The NRF 1500 supports a service discovery function. The NRF 1500 receives an NF discovery request from an NF instance, and provides information of a discovered NF instance to the NF instance. In addition, the NRF 1500 maintains available NF instances and services supported by the available NF instances.

A reference model for a case where the UE 100 accesses one DN 1000 by using one PDU session is illustrated in FIG. 1 for convenience of description, but the disclosure is not limited thereto.

The UE 100 may concurrently access two (i.e., local and central) data networks by using multiple PDU sessions. In this case, two SMFs may be selected for different PDU sessions. Each SMF may have the ability to control both local and central UPFs within a PDU session.

N8: A reference point between the UDM and the AMF

N9: A reference point between two core UPFs

N10: A reference point between the UDM and the SMF

N11: A reference point between the AMF and the SMF

N12: A reference point between the AMF and the AUSF

N13: A reference point between the UDM and the authentication server function (AUSF)

N14: A reference point between two AMFs

N15: A reference point between the PCF and the AMF for a non-roaming scenario, and a reference point between the PCF and the AMF in a visited network for a roaming scenario In the following descriptions, the terminal may refer to the UE 100, and the terms UE and terminal may be used interchangeably. In this case, unless specifically defined additionally, the terminal should be understood as the UE 100.

Examples of URSP rules may be as shown in Table 1.

TABLE 1

| URSP Rules | | | | | | | | |
|---|---|---|---|---|---|---|---|---|
| | Traffic Descriptor (TD) APPID, DNN, IP, | | Route Selection Component (RSC) | | | | | |
| P | FQDN, CC | P | S-NSSAI | DNN | SSC Mode | PDU-Type | Access-Type |
| 1 | App#1 | 1 | S-NSSAI#1 | DNN#1 | SSC#3 | IPv4 | 3GPP |
| 2 | App#2 | 1 | S-NSSAI#2 | DNN#2 | SSC#1 | IPv4/v6 | 3GPP |
| | | 2 | S-NSSAI#2 | DNN#2 | — | — | Non-3GPP |
| 4 | App#1, CC = internet, supl | 1 | S-NSSAI#1 | DNN#1 | — | — | Non-3GPP |
| 5 | App#3, CC = ims | 1 | S-NSSAI#3 | DNN#3 | — | — | Multi-Access |
| 6 | App#1 | 1 | S-NSSAI#1 | DNN#1 | — | — | Multi-Access |
| 7 | * (match all) | 1 | S-NSSAI#4 | DNN#4 | SSC#3 | — | — |

In addition, the UE 100 may concurrently access two (i.e., local and central) data networks provided within one PDU session.

The NSSF 1400 may select a set of network slice instances serving the UE 100. In addition, the NSSF 1400 may determine allowed network slice selection assistance information (NSSAI), and perform mapping to subscribed single-network slice selection assistance information (S-NSSAI) when necessary. In addition, the NSSF 1400 may determine configured NSSAI, and perform mapping to subscribed S-NSSAI when necessary. In addition, the NSSF 1400 may determine an AMF set used to serve the UE 100, or may determine a list of candidate AMFs by asking the NRF 1500 according to a configuration.

The NRF 1500 supports a service discovery function. The NRF 1500 receives an NF discovery request from an NF instance, and provides information of a discovered NF instance to the NF instance. In addition, the NRF 1500 maintains available NF instances and services supported by the available NF instances.

In the 3GPP system, a conceptual link connecting NFs in the 5G system is defined as a reference point. Reference points included in the 5G system architecture described in FIG. 1 are described below.

N1: A reference point between the UE and the AMF

N2: A reference point between the (R)AN and the AMF

N3: A reference point between the (R)AN and the UPF

N4: A reference point between the SMF and the UPF

N5: A reference point between the PCF and the AF

N6: A reference point between the UPF and a data network

N7: A reference point between the SMF and the PCF

In 5GC, the PCF may provide policy information to the UE, and UE policy information may include a UE routing selection policy (UE route selection policy (URSP)). The UE routing selection policy may be referred to as UE route selection policy. The URSP is used by the UE 100, and may be used when determining whether an application detected by the UE 100 can be associated with an already established PDU session, offloaded to a non-3GPP access existing outside the PDU session, or routed via ProSe Layer-3 UE-to-Network relay existing outside the PDU session, whether a new PDU session is established and the application can be associated with the same, or the like. The URSP may include one or more URSP rules, and one URSP rule may include one traffic descriptor and one or more route selection components (RSCs). Table 1 describes an example of the URSP rules.

A traffic descriptor (TD) may include matching criteria that enables identification of the detected application or traffic of the application. A specific example is as follows:

a) Application descriptor: Information which may refer to an application of the UE 100. For example, an application descriptor may include an APPID including an OSID and an OSAPPID.

b) IP descriptor: Displaying an IP address that indicates a destination address of an IP packet transmitted by the UE 100. An IP descriptor may include an IP 3-tuple that is an IP destination address, a port number, and a protocol.

c) Domain descriptor: Expressing, in the form of a fully qualified domain name (FQDN), a destination address of a server to which the UE 100 is connected.

d) Non-IP descriptor: Information which may designate a recipient of non-IP data.

e) DNN: Data network name.

f) Connection capability (CC): Corresponding to type information which may designate characteristics of connected traffic, wherein CC may have values, such as an IP multimedia subsystem (IMS), a multimedia message service (MIMS), and Internet.

The route selection component (RSC) may include, when a traffic descriptor capable of identifying an application detected by the UE 100 is specified, PDU session attribute information to determine a PDU session with which the application or application traffic is to be associated. A specific example is as follows:

g) SSC Mode selection: An element which specifies session and service continuity, wherein SSC mode selection may have values, such as SSC Mode 1, SSC Mode 2, and SSC Mode 3.

h) Network slice selection: Information which may designate a network slice.

i) DNN selection: Data network name.

j) PDU session type selection: An element which may designate a type of PDU-session capable of designating IPv4, IPv6, IPv4v6, Ethernet, or non-IP.

k) Non-seamless offload indication: Indicating that application traffic may be offloaded via non-3GPP access that exists outside a PDU session.

l) ProSe Layer-3 UE-to-Network relay offload indication: Indicates that application traffic may be offloaded via ProSe Layer-3 UE-to-Network relay that exists outside a PDU session.

m) Access type preference: An element indicating whether a PDU session is a PDU session connected via 3GPP access, is a session connected via non-3GPP access, is a session supporting multi-access connection using both 3GPP access and non-3GPP access, or the like.

n) PDU session pair ID: An element indicating an identifier in which application traffic is shared in redundant PDU sessions.

O) Redundancy sequence number (RSN): An element indicating an identifier used in redundant transmission.

Multiple URSP rules may be divided into policy section (PS) of a UE policy container. In the disclosure, the multiple URSP rules may be divided into multiple policy sections so as not to exceed a maximum allowable transmission size of a NAS layer. A single URSP rule may not be divided into two PSs. A complete URSP rule may be included in one policy section.

The USRP rules have priorities for each rule. According to the disclosure, each URSP rule may include a URSP rule identifier enabling identification of the URSP rule. More specifically, the URSP rule identifier may refer to a traffic parameter that enables the UE to distinguish a UE application.

Figure 2:
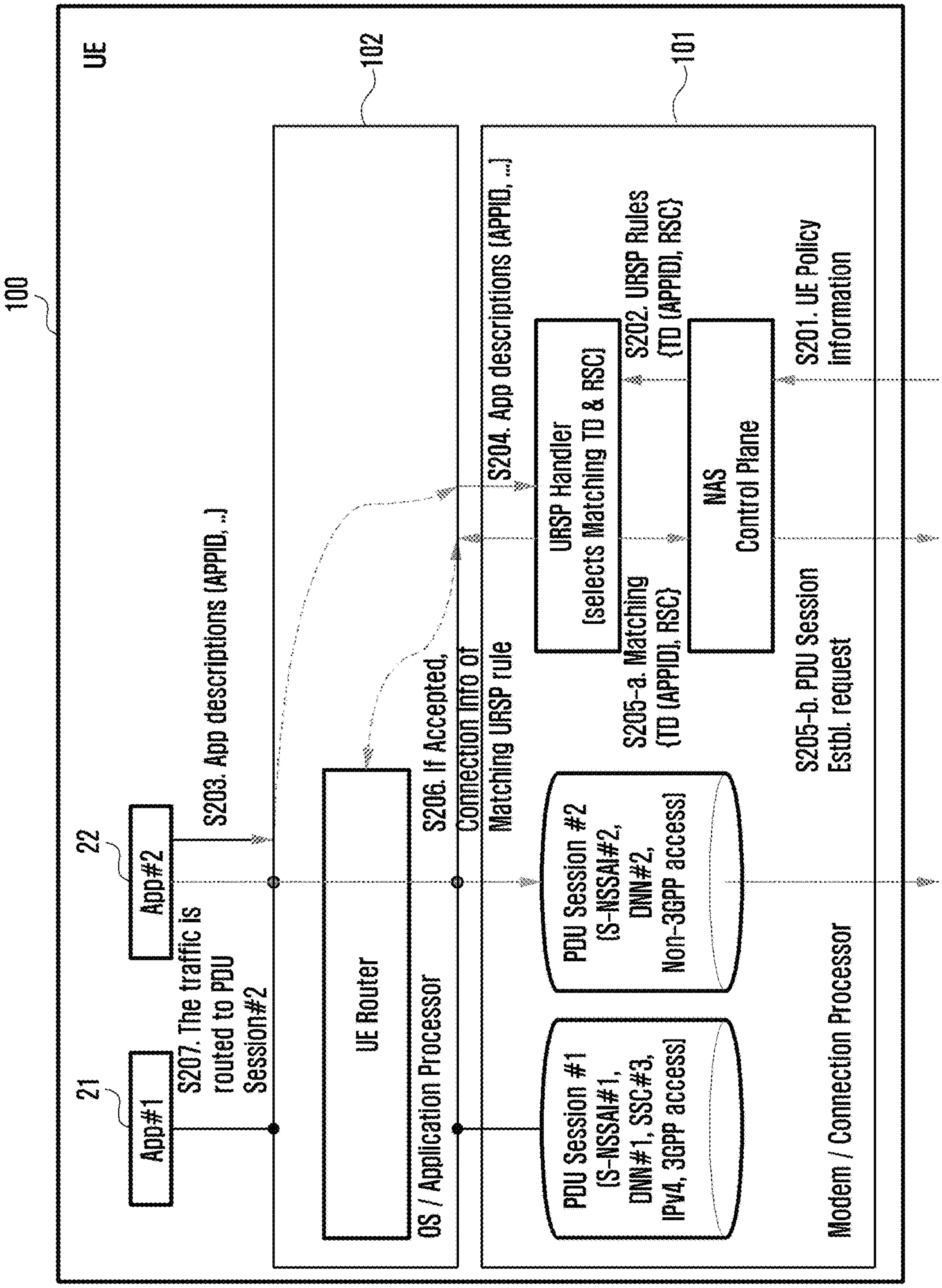
FIG. 2 is a conceptual diagram for illustrating a method in which, based on a URSP, a UE 100 associates an application with a PDU session in a wireless communication system according to the disclosure.

FIG. 2 is a conceptual diagram for illustrating a procedure in which, based on a URSP, the UE 100 associates an application 21 or 22 with a PDU session in the wireless communication system according to the disclosure.

Referring to FIG. 2, the UE 100 may include a module (hereinafter, NAS control plane) in charge of managing a message related to a NAS control plane, a module (hereinafter, URSP handler) in charge of matching an application detected by the UE 100 with a URSP rule and associating the application with a PDU session, and a module (hereinafter, UE router) in charge of configuring an internal interface of the UE 100, which is related to a network connection, etc. so that traffic of the application may be transmitted/received via the associated PDU session. Each of the UE router, the URSP handler, and the NAS control plane may exist in an application layer, an operating system (OS), an application processor, a modem, a connection processor, etc. of the UE 100 depending on a UE manufacturing method. In the disclosure, descriptions are provided based on a case where the application (app) 21 or 22 is located in the application layer, the UE router is located in the OS included in the application processor, and the URSP handler and the NAS control plane are located in the modem included in the connection processor. For example, the connection processor may be referred to as a transceiver 101. The application processor may be referred to as a controller 102. According to various embodiments, the controller 102 may include the connection processor and the application processor.

Operation S201: The UE 100 may receive UE policy information from the PCF 600. As a specific example, the NAS control plane may process, transmit/receive, and store the received UE policy information.

Operation S202: The UE 100 may process a URSP. As a specific example, the NAS control plane of operation S201 may provide the URSP to the URSP handler. In addition, when the UE 100 detects the application 21 or 22, the URSP handler may perform procedures, such as determining a matching URSP rule and associating the application with a PDU session. In this case, the URSP rule enables identification of the application 21 or 22 by using APPID.

Operation 203: The UE 100 may detect the application 21 or 22 or traffic of the application 21 or 22. As a specific example, the application layer may provide information enabling identification of the application 21 or 22 to the URSP handler via the OS. In this case, APPID may be used for application identification information.

Operation S204: The UE 100 may associate the detected application 21 or 22 with a PDU session. As a specific example, the URSP handler may use the application identification information, which is received in operation S203, to determine a TD matching a corresponding application in the URSP rule received in operation S202, and may select an RSC applicable to the detected application 21 or 22 from among RSCs of the TD. In this case, when determining the TD matching the detected application 21 or 22, a comparison method may be used to identify whether the same APPID as the APPID of the detected application 21 or 22 is included in the TD. If there is an existing PDU session to which all elements of the selected RSC have been applied, the URSP handler may associate the detected application 21 or 22 with the PDU session, otherwise, the URSP handler may determine to establish a new PDU session.

Operation S205: The UE 100 may perform a procedure according to the determination (association with the existing PDU session, establishment of a new PDU session, or the like) on the URSP rule and PDU session association corresponding to the application 22, which are determined in operation S204. As a specific example, in operation S205-*a*, the URSP handler may provide the NAS control plane with the determination on the URSP rule and PDU session association which are determined in operation S204. When it is determined in operation S204 that establishment of a new PDU session is necessary, the NAS control plane may transmit a PDU session establishment request to 5GC in operation S205-*b*.

Operation S206: When the UE 100 receives, as a result of operation S205, a new PDU session establishment request acceptance from 5GC, the UE 100 may perform, based on the URSP rule determined in operation S204, system setup, etc. required to transmit/receive application traffic via the newly established PDU session. As a specific example, the URSP handler may provide, based on the URSP rule, information required for PDU session setup to the UE router. The information required for PDU session setup may include network slice information, DNN information, PDU session type information, access type information, IP address information, FQDN, etc. indicated by the TD or RSC. The UE router may perform operations, such as interface setup, socket binding, etc. necessary between the application layer and the application processor, and between the application processor and the connection processor, by using the information received from the URSP handler.

Operation S207: The UE 100 may transmit/receive traffic of the application 22 via the associated PDU session.

Figure 3:
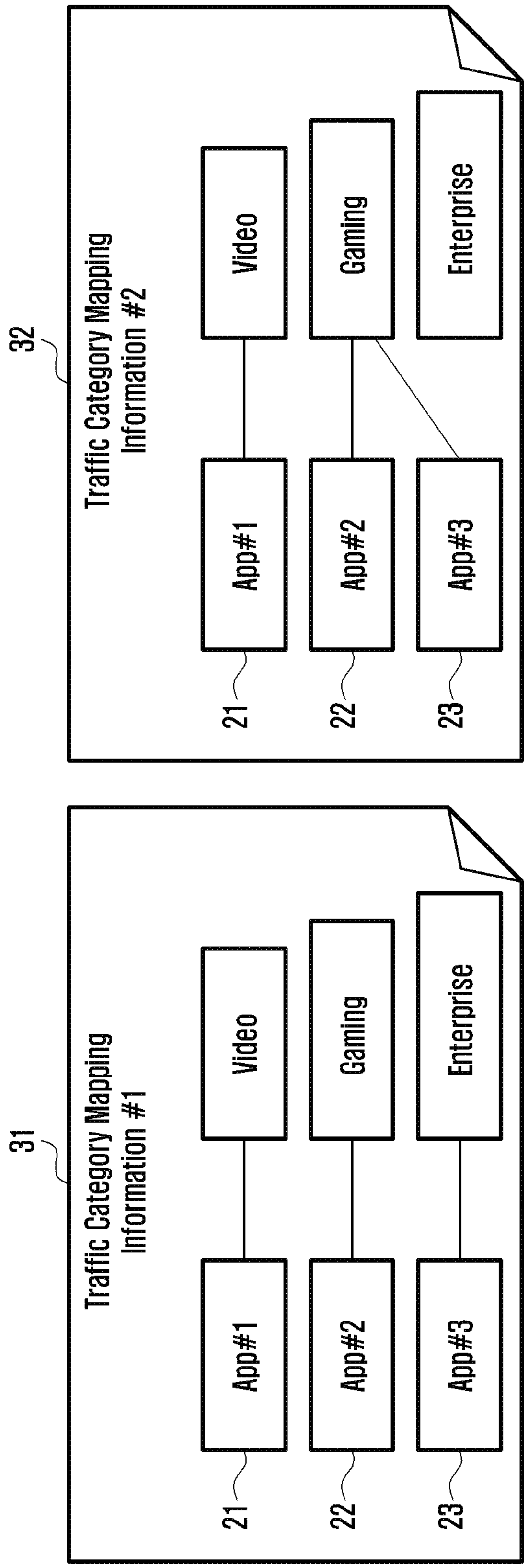
FIG. 3 is a conceptual diagram for illustrating a method of associating an application with a traffic category in the wireless communication system according to the disclosure.

FIG. 3 is a conceptual diagram for illustrating a method of associating the application 21, 22, or 23 with a traffic category in the wireless communication system according to the disclosure.

In evaluating the URSP rule applicable to the application 21 or 22 detected by the UE 100 according to the method described in FIG. 2, there may be a case where APPID cannot be used as an application identifier. For example, according to the description of FIG. 2, APPID of the application 21 or 22 detected by the UE 100 in operation S204 may be provided to the URSP handler constituting the modem of the connection processor via the OS of the application processor from the application layer. In this case, depending on an internal situation of the UE 100, APPID may not be provided from the OS to another layer or another module. This may occur due to an OS policy, a user information protection policy, a network neutrality policy, etc. In this case, the application 21 or 22 may be identified by being mapped to a traffic category (TC) rather than APPID.

Traffic category (TC) is an element of a traffic descriptor which may classify the applications 21, 22, or 23 based on characteristics of a service that the application provides to a user. Examples of the traffic category are as follows.

p) Enterprise (for enterprise/corporation): An application related to an enterprise or enterprise service q) Gaming: An application related to a game service (e.g., a game service requiring low latency)

r) Video/video streaming: An application related to a video streaming service (e.g., an HD video streaming service, a 4K video streaming service, etc.)

One application may use one or more traffic categories, and one traffic category may be used for one or more applications. FIG. 3 illustrates examples of a mapping relationship between an application and a traffic category.

For example, according to traffic category mapping information #1 31 in FIG. 3, app (application) #1 21 may use video as a TC value, app #2 22 may use gaming as a TC value, and app #3 23 may use enterprise as a TC value.

As another example, according to traffic category mapping information #2 32 in FIG. 3, application #1 21 may use video as a TC value, application #2 22 may use gaming as a TC value, and application #3 23 may use gaming as a TC value.

The traffic category mapping information 31 and 32 may describe the mapping relationships between the applications 21, 22, and 23 with TCs, and based on these mapping relationships, URSP rules may provide the TCs as matching criteria enabling identification of the applications 21, 22, and 23. Table 2 describes examples of URSP rules using TC.

TC may be included as an element of the TD and may be used in the following methods.

S) TC may be provided in the form of an application descriptor in the TD. For example, in the form of the application descriptor, APPID (OSID+OSAppID) or TC may be used.

t) TC may be provided as an element other than an application descriptor capable of indicating the applications 21, 22, and 23 in the TD. As a specific example, in the TD, both an application descriptor and TC may be included, or only one thereof may be included.

u) TC may be provided as one of CC values of the TD. For example, enterprise, gaming, video, etc. may be used as CC values.

Examples of URSP rules using traffic categories may be as shown in Table 2 below.

TABLE 2

URSP Rules using TC

| P | Traffic Descriptor (TD) APPID, TC, DNN, IP, FQDN, CC | P | Route Selection Component (RSC) S-NSSAI | DNN | SSC Mode | PDU-Type | Access-Type |
|---|---|---|---|---|---|---|---|
| 1 | TC = Video | 1 | S-NSSAI#1 | DNN#1 | SSC#3 | IPv4 | 3GPP |
| 2 | TC = Gaming | 1 | S-NSSAI#2 | DNN#2 | SSC#1 | IPv4/v6 | 3GPP |
| | | 2 | S-NSSAI#2 | DNN#2 | — | — | Non-3GPP |
| 4 | TC = Video<br>CC = internet, supl | 1 | S-NSSAI#1 | DNN#1 | — | — | Non-3GPP |
| 5 | TC = EnterpriseCC = ims | 1 | S-NSSAI#3 | DNN#3 | — | — | Multi-Access |
| 6 | TC = Video | 1 | S-NSSAI#1 | DNN#1 | — | — | Multi-Access |
| 7 | * (match all) | 1 | S-NSSAI#4 | DNN#4 | SSC#3 | — | — |

Figure 4:
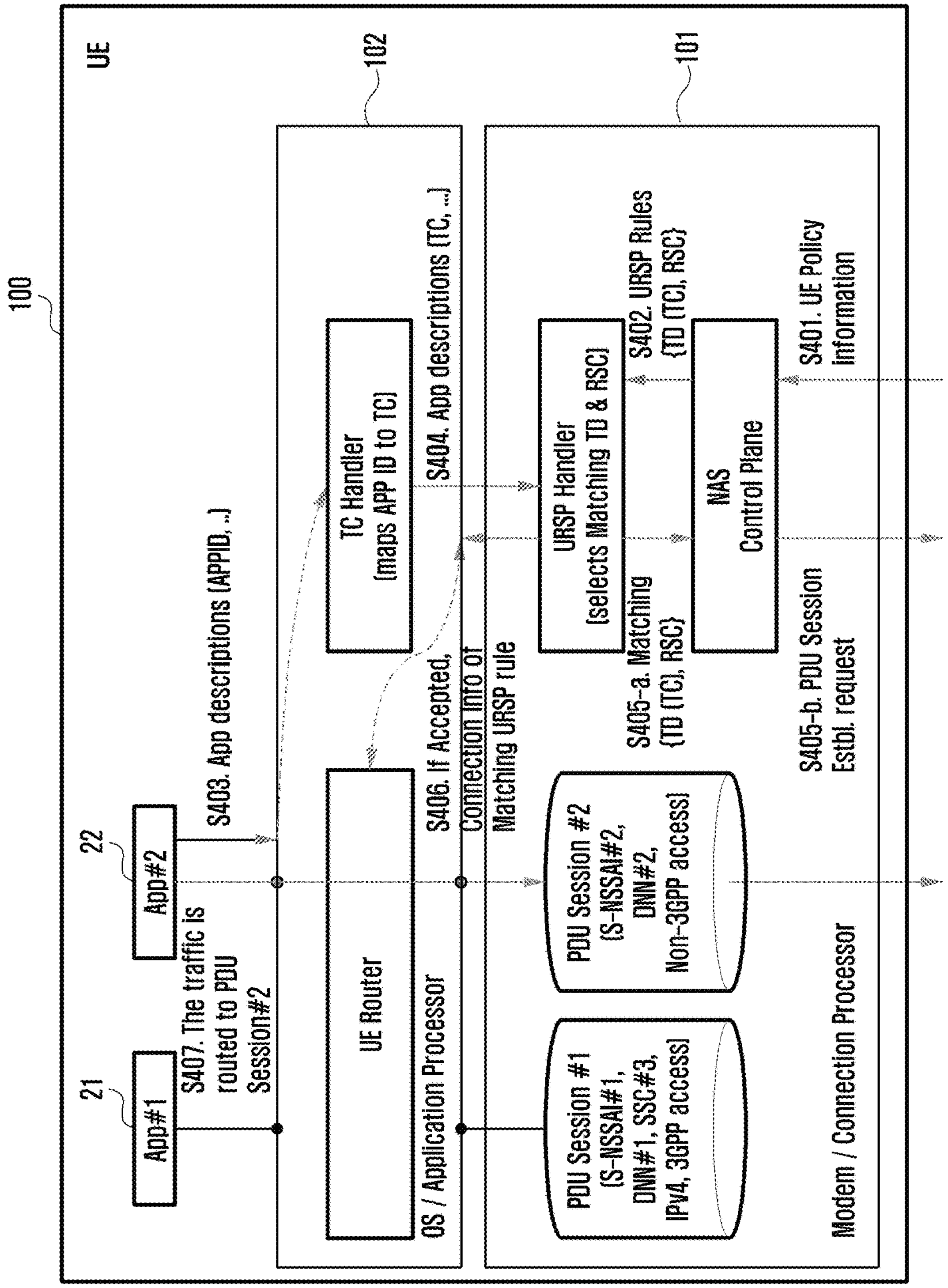
FIG. 4 is a conceptual diagram for illustrating a method in which, based on a URSP, the UE 100 associates an application with a PDU session in the wireless communication system according to the disclosure.

Table 2 describes examples of URSP rules in which TC is used, and describes cases where TC values corresponding to the mapping relationships between TC and the applications 21, 22, and 23, which are illustrated in traffic category mapping information #1 31 of FIG. 3, are used in the URSP rules in replacement of APPID in Table 1. That is, when APPID is used for the same URSP rules, the PCF 600 may provide the URSP as in Table 1 to the UE 100, and when TC is used, the PCF 600 may provide the URSP as in Table 2 to the UE 100. FIG. 4 is a diagram for illustrating a method in which, based on a URSP, the UE 100 associates the application 21 or 22 with a PDU session in the wireless communication system according to an embodiment of the disclosure.

More specifically, FIG. 4 is a diagram for illustrating a procedure in which the UE 100 associates the application with a PDU session, based on a URSP to which a traffic category has been applied, according to an embodiment of the disclosure.

Referring to FIG. 4, the UE 100 may include a module (hereinafter, NAS control plane) in charge of managing a message related to the NAS control plane, a module (hereinafter, TC handler) in charge of mapping the application 21 or 22 detected by the UE 100 to TC, a module (hereinafter, URSP handler) in charge of matching the application detected by the UE 100 with a URSP rule and associating the application with a PDU session, and a module (hereinafter, UE router) in charge of configuring a UE internal interface, etc. related to a network connection so that traffic of the application may be transmitted/received via the associated PDU session. Each of the UE router, the TC handler, the URSP handler, and the NAS control plane may exist in the application layer, the operating system (OS), the application processor, the modem, the connection processor, etc. of the UE 100 depending on a UE manufacturing method. In the disclosure, descriptions are provided based on a case where the application 21 or 22 is located in the application layer, the UE router and the TC handler are located in the OS included in the application processor, and the URSP handler and the NAS control plane are located in the modem included in the connection processor. For example, the connection processor may be referred to as the transceiver 101. The application processor may be referred to as the controller 102. According to various embodiments, the controller 102 may include the connection processor and the application processor.

Operation S401: The UE 100 may receive UE policy information from the PCF 600. As a specific example, the NAS control plane may process, transmit/receive, and store the received UE policy information. The UE policy information received by the UE 100 may include a URSP rule including TD using TC.

Operation S402: The UE 100 may process a URSP. As a specific example, the NAS control plane in operation 1 may provide the URSP to the URSP handler. In addition, when the UE 100 detects the application 21 or 22, the URSP handler may perform procedures, such as determining a matching URSP rule and associating the application with a PDU session. In this case, the URSP rule enables identification of the application 21 or 22 by using TC.

Operation S403: The UE 100 may detect the application 21 or 22 or traffic of the application 21 or 22. As a specific example, the application layer may provide information enabling identification of the application 21 or 22 to the TC handler of the OS. In the TC handler, traffic category mapping information may be stored/configured. The TC handler may map an application identifier to a traffic category, based on traffic category mapping information that the TC handler has. For example, if the TC handler has information of content as in traffic category mapping information #1 31 of FIG. 3, and detects an APPID value of appliction #2 22, the TC handler may map gaming to a TC value. The URSP may provide the mapped TC value to the URSP handler. The traffic category mapping information that the TC handler has may or may not be identical to the traffic category mapping information used at generation of the URSP included in the UE policy information received by the UE from the network/PCF in operation 1.

Operation S404: The UE 100 may associate the detected application 21 or 22 with a PDU session. As a specific example, the URSP handler may use the TC value, which is received from the TC handler in operation S403, to determine a TD matching a corresponding application in the URSP rule received in operation S402, and may select an RSC applicable to the detected application 21 or 22 from among RSCs of the TD. In this case, determining of the TD matching the detected application 21 or 22 may correspond to a comparison method for identifying whether the same TC value as the TC value of the detected application 21 or 22 is included in the TD. If there is an existing PDU session to which all elements of the selected RSC have been applied, the URSP handler may associate the detected application 21 or 22 with the PDU session, otherwise, the URSP handler may determine to establish a new PDU session.

Operation S405: The UE 100 may perform a procedure according to the determination (association with the existing PDU session, establishment of a new PDU session, or the like) on the URSP rule and PDU session association corresponding to the application 22, which are determined in operation S404. As a specific example, in operation S405-*a*, the URSP handler may provide the NAS control plane with the determination on the URSP rule and PDU session association which are determined in operation S404. When it is determined in operation S404 that establishment of a new PDU session is necessary, the NAS control plane may transmit a PDU session establishment request to 5GC in operation S405-*b*.

Operation S406: When the UE 100 receives, as a result of operation S405, a new PDU session establishment request acceptance from 5GC, the UE 100 may perform, based on the URSP rule determined in operation S404, system setup, etc. required to transmit/receive application traffic via the newly established PDU session. As a specific example, the URSP handler may provide, based on the URSP rule, information required for PDU session setup to the UE router. The information required for PDU session setup may include network slice information, DNN information, PDU session type information, access type information, IP address information, FQDN, etc. indicated by the TD or RSC. The UE router may perform operations, such as interface setup, socket binding, etc. necessary between the application layer and the application processor, and between the application processor and the connection processor, by using the information received from the URSP handler.

Operation S407: The UE 100 may transmit/receive traffic of the application 21 or 22 via the associated PDU session.

Figure 5:
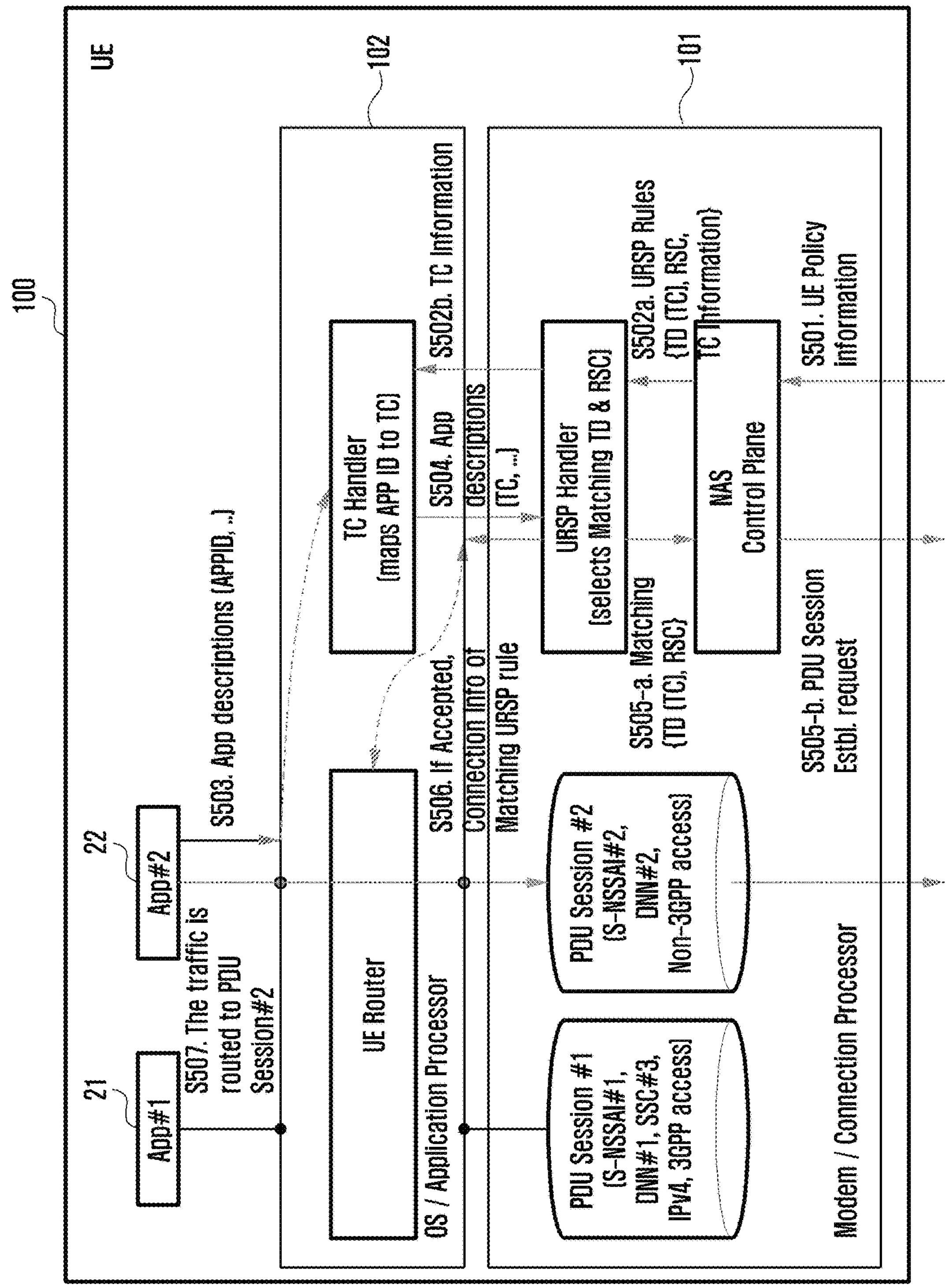
FIG. 5 is a conceptual diagram for illustrating a method in which, based on a URSP, the UE 100 associates an application with a PDU session in the wireless communication system according to the disclosure.

FIG. 5 is a diagram for illustrating a method in which, based on a URSP, the UE 100 associates the application 21 or 22 with a PDU session in the wireless communication system according to the disclosure.

More specifically, FIG. 5 is a diagram for illustrating a method in which the UE 100 associates the application with a PDU session, based on traffic category mapping information and the URSP to which a traffic category has been applied, according to an embodiment of the disclosure.

Referring to FIG. 5, the UE 100 may include a module (hereinafter, NAS control plane) in charge of managing a message related to the NAS control plane, a module (hereinafter, TC handler) in charge of mapping the application 21 or 22 detected by the UE 100 to TC, a module (hereinafter, URSP handler) in charge of matching the application 21 or 22 detected by the UE 100 with a URSP rule and associating the application with a PDU session, and a module (hereinafter, UE router) in charge of configuring a UE internal interface, etc. related to a network connection so that traffic of the application may be transmitted/received via the associated PDU session. Each of the UE router, the TC handler, the URSP handler, and the NAS control plane may exist in the application layer, the operating system (OS), the application processor, the modem, the connection processor, etc. of the UE 100 depending on a UE manufacturing method. In the disclosure, descriptions are provided based on a case where the application 21 or 22 is located in the application layer, the UE router and the TC handler are located in the OS included in the application processor, and the URSP handler and the NAS control plane are located in the modem included in the connection processor. For example, the connection processor may be referred to as the transceiver 101. The application processor may be referred to as the controller 102. According to various embodiments, the controller 102 may include the connection processor and the application processor.

Operation S501: The UE 100 may receive UE policy information from the PCF 600. As a specific example, the NAS control plane may process, transmit/receive, and store the received UE policy information. The UE policy information received by the UE 100 may include a URSP rule including TD using TC and traffic category mapping information used by the PCF during URSP rule determination.

Operation S502: The UE 100 may process a URSP. As a specific example, the NAS control plane in operation S501 may provide the URSP to the URSP handler in operation S502*a*. In addition, the URSP handler may provide the traffic category mapping information to the TC handler in operation S502*b*. In addition, when the UE 100 detects the application 21 or 22, the URSP handler may perform procedures, such as determining a matching URSP rule and associating the application 21 or 22 with a PDU session. In this case, the URSP rule enables identification of the application 21 or 22 by using TC.

Operation S503: The UE 100 may detect the application 21 or 22 or traffic of the application 21 or 22. As a specific example, the application layer may provide information enabling identification of the application 21 or 22 to the TC handler of the OS. The TC handler may map an application identifier to a traffic category, based on traffic category mapping information received in operation S502*b*. For example, if the TC handler has received information of content as in traffic category mapping information #1 31 of FIG. 3, and detects an APPID value of appliction #2 22, the TC handler may map gaming to a TC value. The URSP may provide the mapped TC value to the URSP handler. The traffic category mapping information (received TC mapping information) received by the TC handler in operation S502*b* may or may not be identical to traffic category mapping information (configured TC Mapping information) previously stored/configured by the TC handler. If the two pieces of TC mapping information have different contents, the UE 100 may use more recent information, give priority to and apply the information provided from the network (information received in operation S502*b*), or make a determination based on other configuration information of the UE or other requests received from the network. Alternatively, the UE 100 may ignore the TC mapping information previously stored/configured by the UE, and use only the information received from the network (information received in operation S502*b*).

Operation S504: The UE 100 may associate the detected application 21 or 22 with a PDU session. As a specific example, the URSP handler may use the TC value, which is received from the TC handler in operation S503, to determine a TD matching a corresponding application in the URSP rule received in operation S502, and may select an RSC applicable to the detected application 21 or 22 from among RSCs of the TD. In this case, when determining the TD matching the detected application 21 or 22, a comparison method may be used to identify whether the same TC value as the TC value of the detected application 21 or 22 is included in the TD. If there is an existing PDU session to which all elements of the selected RSC have been applied, the URSP handler may associate the detected application 21 or 22 with the PDU session, otherwise, the URSP handler may determine to establish a new PDU session.

Operation S505: The UE 100 may perform a procedure according to the determination (association with the existing PDU session, establishment of a new PDU session, or the like) on the URSP rule and PDU session association corresponding to the application 22, which are determined in operation S504. As a specific example, in operation S505-*a*, the URSP handler may provide the NAS control plane with the determination on the URSP rule and PDU session association which are determined in operation S504. When it is determined in operation S504 that establishment of a new PDU session is necessary, the NAS control plane may transmit a PDU session establishment request to 5GC in operation S505-*b*.

Operation S506: When the UE 100 receives, as a result of operation S505, a new PDU session establishment request acceptance from 5GC, the UE 100 may perform, based on the URSP rule determined in operation S504, system setup, etc. required to transmit/receive application traffic via the newly established PDU session. As a specific example, the URSP handler may provide, based on the URSP rule, information required for PDU session setup to the UE router. The information required for PDU session setup may include network slice information, DNN information, PDU session type information, access type information, IP address information, FQDN, etc. indicated by the TD or RSC. The UE router may perform operations, such as interface setup, socket binding, etc. necessary between the application layer and the application processor, and between the application processor and the connection processor, by using the information received from the URSP handler.

Operation S507: The UE 100 may transmit/receive traffic of the application via the associated PDU session.

Figure 6A:
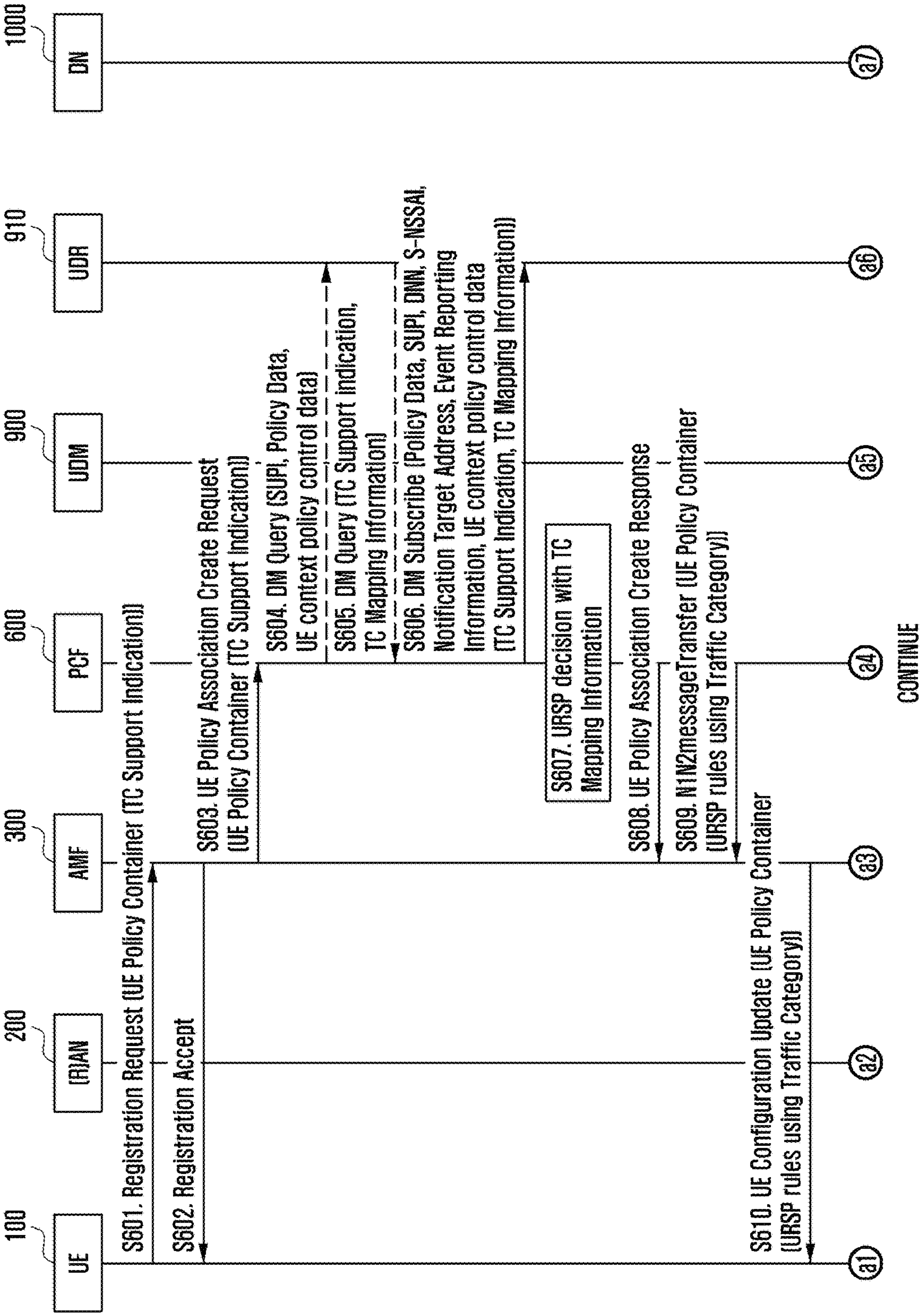
FIG. 6A and FIG. 6B are flowcharts illustrating a procedure of mapping a UE route selection policy in the wireless communication system according to the disclosure.
Figure 6B:
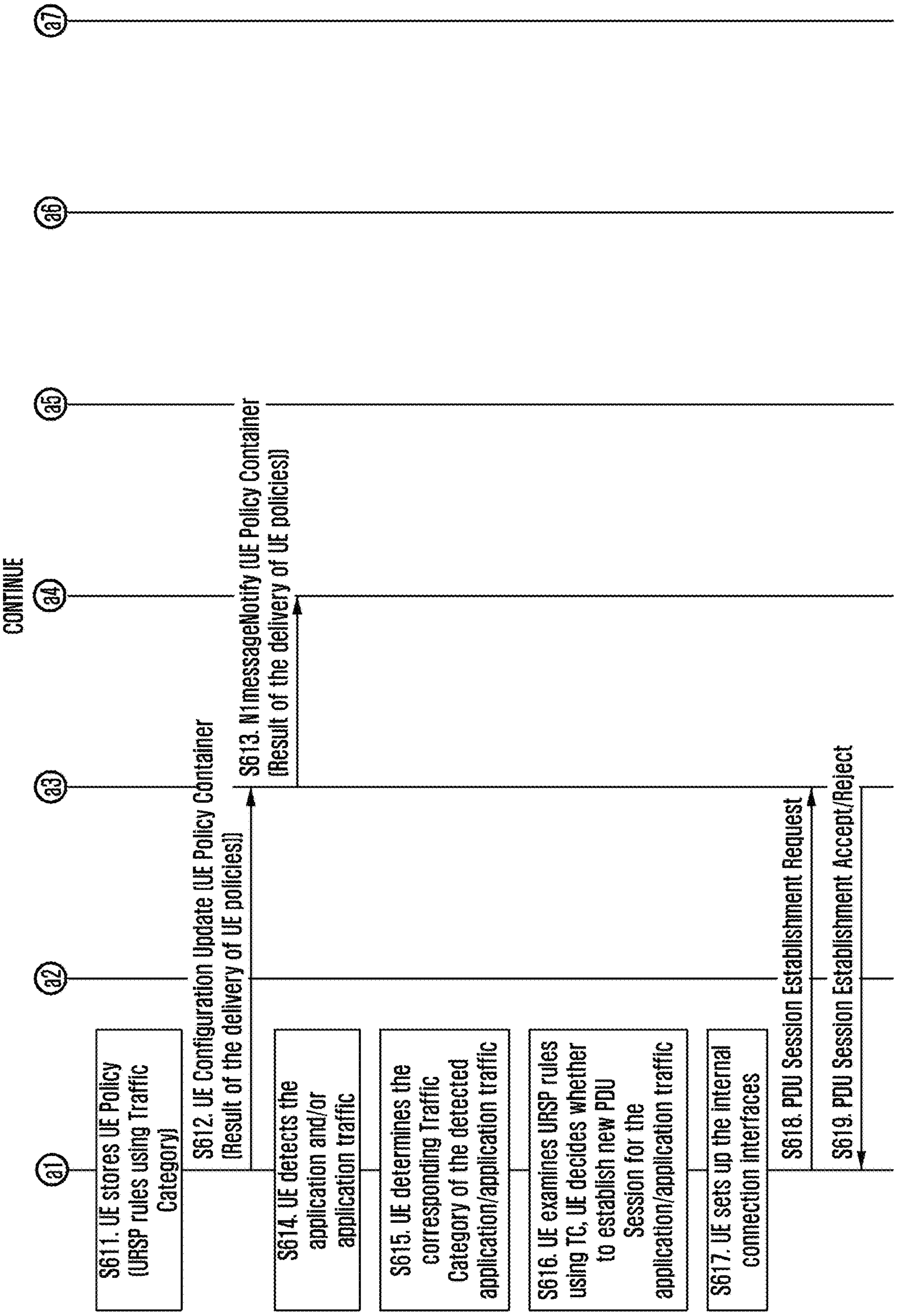

FIG. 6A and FIG. 6B are flowcharts illustrating a procedure of mapping a UE route selection policy in the wireless communication system according to the disclosure.

Operation S601: The UE 100 may transmit a registration request message to the AMF 300 via the (R)AN 200. The registration request message may include a traffic category support indication (hereinafter, TC support indication) indicating that the UE 100 is able to identify an application by using a traffic category. The TC support indication may be included in a UE policy container. The AMF 300 may receive the registration request message from the UE 100 via the (R)AN 200. The AMF 300 having received the registration request including the TC support indication may continue to perform the remaining registration procedure.

Operation S602: When 5GC determines to accept the registration request of the UE 100, the registration acceptance may be transmitted to the UE 100 via the AMF 300. The AMF 300 may transmit a registration acceptance message to the UE 100. The UE 100 may receive the registration acceptance message from the AMF 300.

Operation S603: The AMF 300 may request the PCF 600 to create UE policy association. The AMF 300 may transmit a UE policy associate create request (UE policy associate create request) message to the PCF 600. The PCF 600 may receive the UE policy associate create request message from the AMF 300. The UE policy associate create request message may include the TC support indication. In this case, the TC support indication may be included in the UE policy container. When the AMF 300 receives the UE policy container from the UE 100 in operation S601, the AMF 300 may transfer the same to the PCF 600. When the AMF 300 receives the TC support indication from the UE 100 separately or via the UE policy container in operation S601, the AMF 300 may transfer the same to the PCF 600. The AMF 300 may determine whether the UE 100 supports TC, based on subscription information, etc., and may transfer the TC support indication to the PCF 600.

Operation S604: The PCF 600 may request, from the UDR 910, information required to determine a UE policy. The PCF 600 may transmit a DM query request message to the UDR 910. The UDR 910 may receive the DM query request message from the PCF 600. The DM query request message may include SUPI, policy data, and UE context policy control data. When the PCF 600 has received the TC support indication in operation S603 but is unable to determine whether the UE 100 supports TC, or has received the TC support indication but does not have TC mapping information for the UE 100, the PCF 600 may request the TC support indication and/or the TC mapping information from the UDR 910.

Operation S605: The UDR 910 may provide the TC support indication and/or the TC mapping information to the PCF 600. The UDR 910 may transmit a DM query response message to the PCF 600. The PCF 600 may receive the DM query response message from the UDR 910. The DM query response message may include the TC support indication and/or the TC mapping information. The TC support indication and the TC mapping information may be provided as one piece of UE context policy control subscription information.

Operation S606: The PCF 600 may subscribe to TC support indication and/or TC mapping information so as to be notified by the UDR 910 about whether the UE 100 supports TC or a change related to TC mapping information applicable to the UE 100 when the change occurs. The PCF 600 may transmit a DM subscription (DM subscribe) message to the UDR 910. The UDR 910 may receive the DM subscription message from the PCF 600. The DM subscription message may include policy data, SUPI, DNN, S-NSSAI, a notification target address, event reporting information, and UE context policy control data. The UE context policy control data may include the TC support indication and/or TC mapping information.

Operation S607: The PCF 600 may determine a URSP for the UE 100, and may determine, based on the TC mapping information, a URSP rule enabling application identification using TC. The TC mapping information for the UE 100 may be stored/configured in the PCF 600. The PCF 600 may request the TC mapping information from the UDR 910 as described in operation S604, and the PCF 600 may acquire and then store the same.

Operation S608: The PCF 600 may transmit a UE policy association create response message to the AMF 300. The AMF 300 may receive the UE policy association create response message from the PCF 600.

Operation S609: The PCF 600 may transmit the URSP rules enabling application identification using TC to the UE 100 via the AMF 300 by using an N1N2message transfer message. The PCF 600 may transmit the N1N2message transfer message to the AMF 300. The AMF 300 may receive the N1N2message transfer message from the PCF 600. The N1N2message transfer message may include the UE policy container including the URSP rules generated using the traffic category.

Operation S610: The AMF 300 may transfer, to the UE 100, the URSP rule enabling application identification using TC, which have been received from the PCF 600 in operation S609. For example, the AMF 300 may transmit a UE configuration update request message to the UE 100. The UE 100 may receive the UE configuration update request message from the AMF 300. The UE configuration update request message may include the UE policy container including URSP rules generated using the traffic category.

Operation S611: The UE 100 may store the UE policy received from the network in operation S610. For example, the UE policy may include the UE policy container including the URSP rules generated using the traffic category.

Operation S612: The UE 100 may transmit a result of the UE policy transmission (e.g., success or failure) to the AMF 300. For example, the UE 100 may transmit a UE configuration update response message to the AMF 300 via the (R)AN 200. The AMF 300 may receive the UE configuration update response message from the UE 100 via the (R)AN 200. The UE configuration update response message may include the UE policy container indicating the result of the UE policy transmission (e.g., success or failure).

Operation S613: The AMF 300 may transfer, to the PCF 600, the result of the UE policy transmission. For example, the AMF 300 may transmit an N1messageNotify message to the PCF 600. The PCF 600 may receive the N1messageNotify message from the AMF 300. The N1messageNotify message may include the UE policy container indicating the result of the UE policy transmission.

Operation S614: The UE 100 may detect an application or traffic of the application.

Operation S615: The UE 100 may determine a TC value corresponding to the detected application. In this case, the TC mapping information may be stored/configured in the UE 100, and the UE 100 may determine a value corresponding to the application, based on the TC mapping information that the UE 100 has.

Operation S616: The UE 100 may examine, using the TC value determined in operation S615, the URSP rules enabling application identification using TC, which have been received in operation S610, so as to determine a URSP rule corresponding to the detected application, and may determine whether to establish a new PDU session for the detected application.

Operation S617: The UE 100 may configure an internal connection interface, etc. to transmit/receive application traffic via a PDU session, based on the URSP rule determined in operation S616.

Operation S618: When it is determined to establish a new PDU session for the application in operation S616, the UE 100 may transmit a PDU session establishment request to the network via the AMF 300. The network may perform the remaining procedure for PDU session establishment.

Operation S619: The network may determine whether to accept or make a determination on the PDU session establishment request, and may transmit acceptance or rejection for the PDU session establishment to the UE 100 via the AMF 300.

Figure 7A:
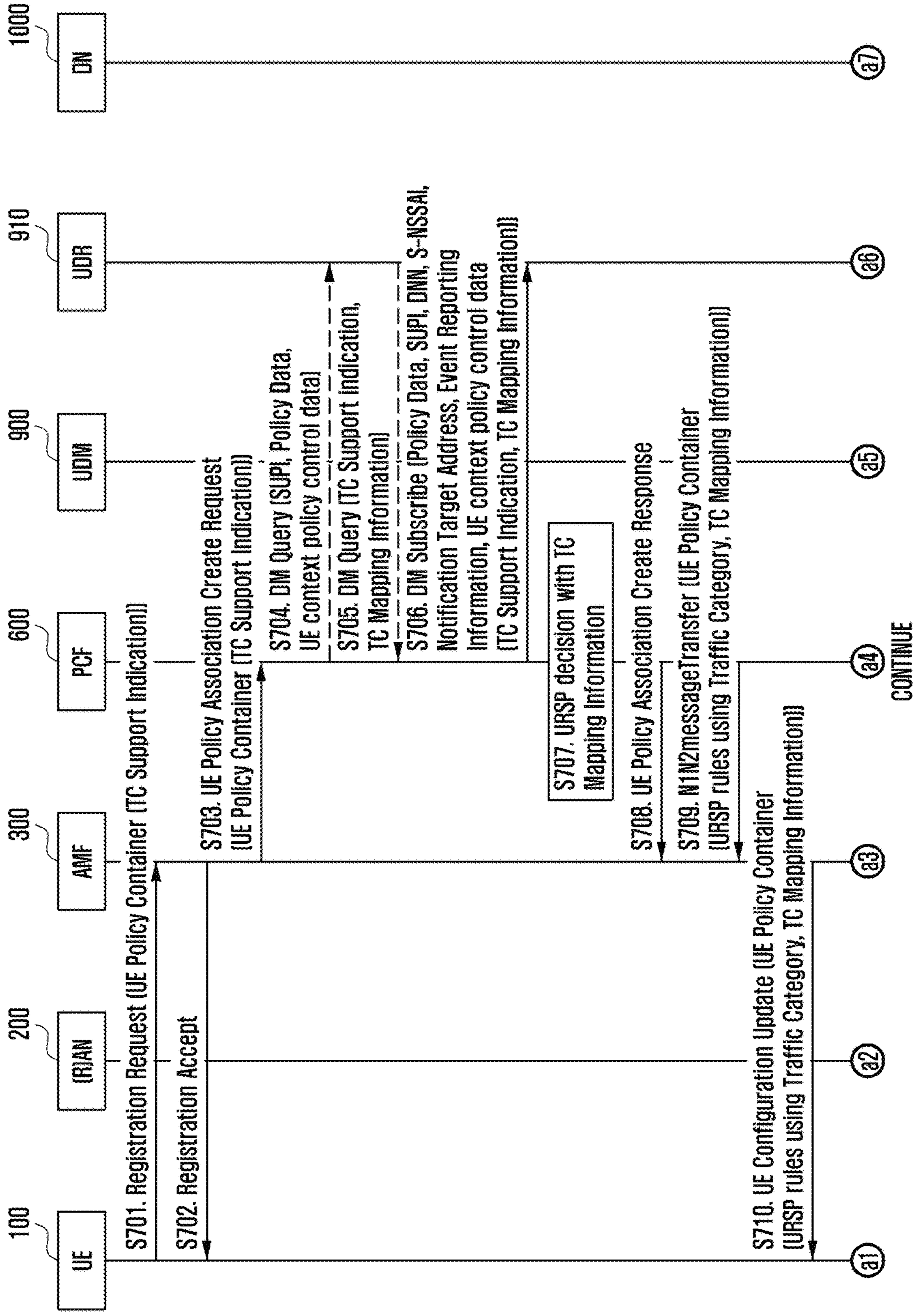
FIG. 7A and FIG. 7B are flowcharts illustrating a procedure of mapping a UE route selection policy in the wireless communication system according to the disclosure.
Figure 7B:
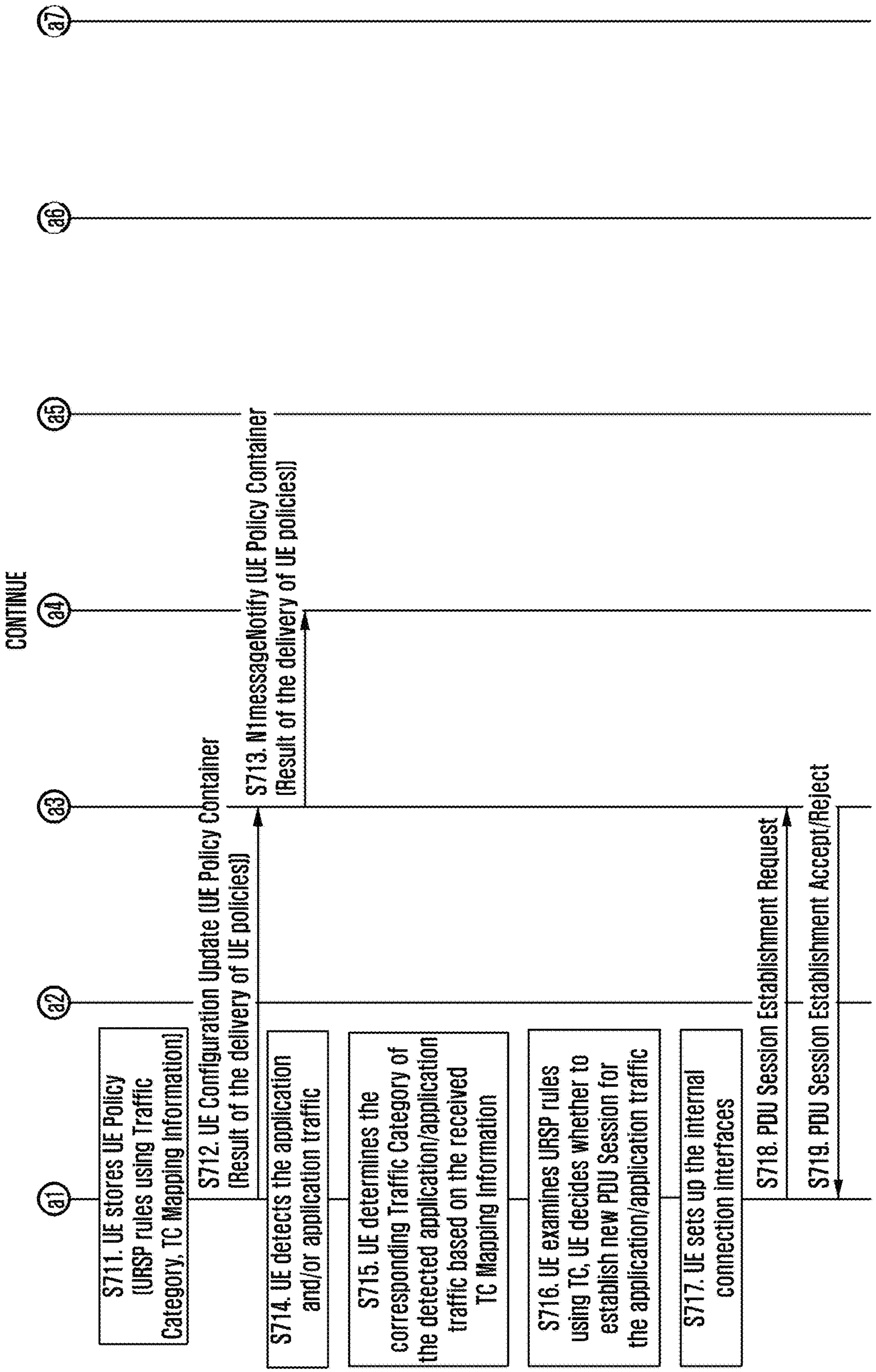
Figure 8A:
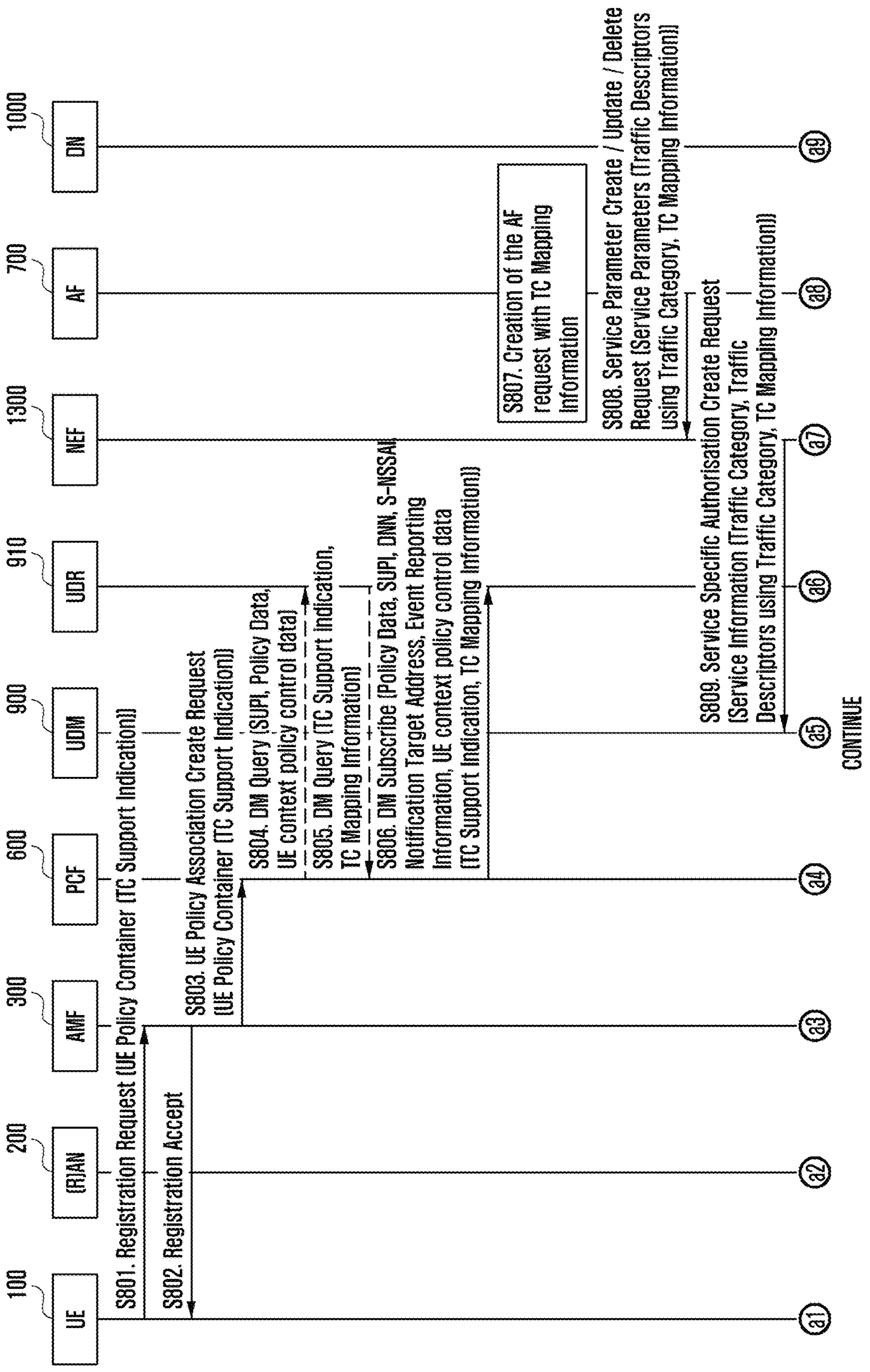
FIG. 8A to FIG. 8D are flowcharts illustrating a procedure of mapping a UE route selection policy in the wireless communication system according to the disclosure.
Figure 8B:
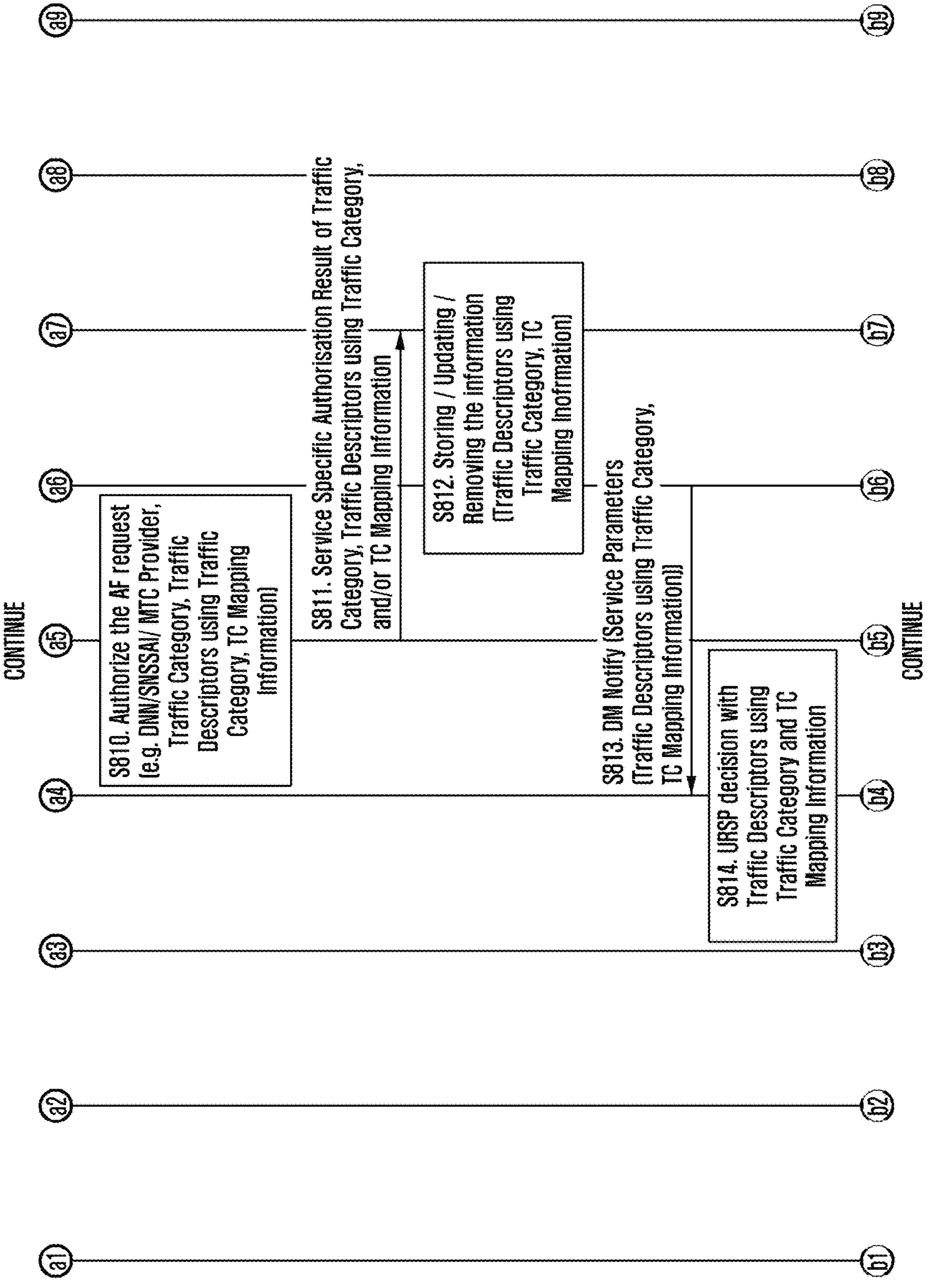
Figure 8C:
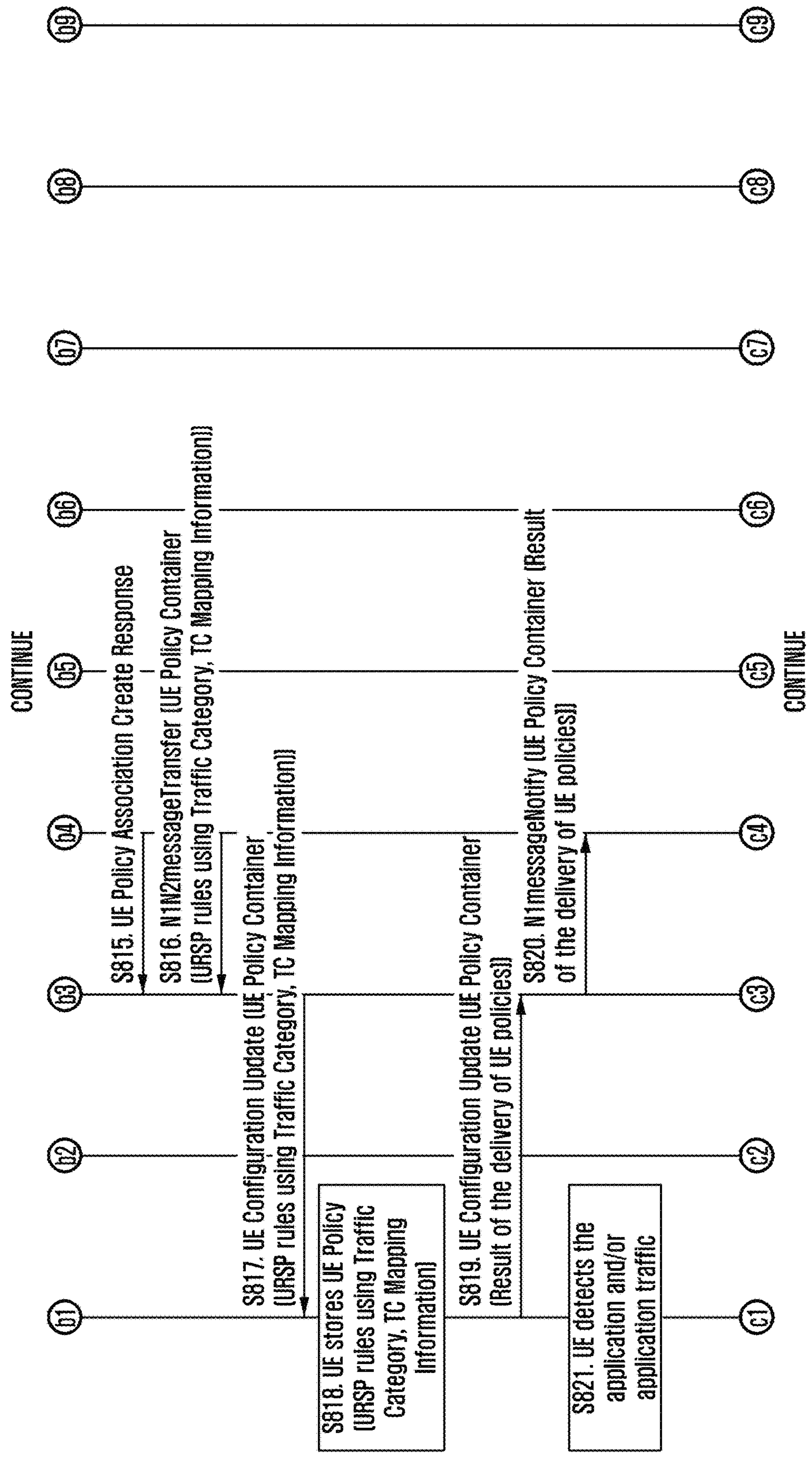
Figure 8D:
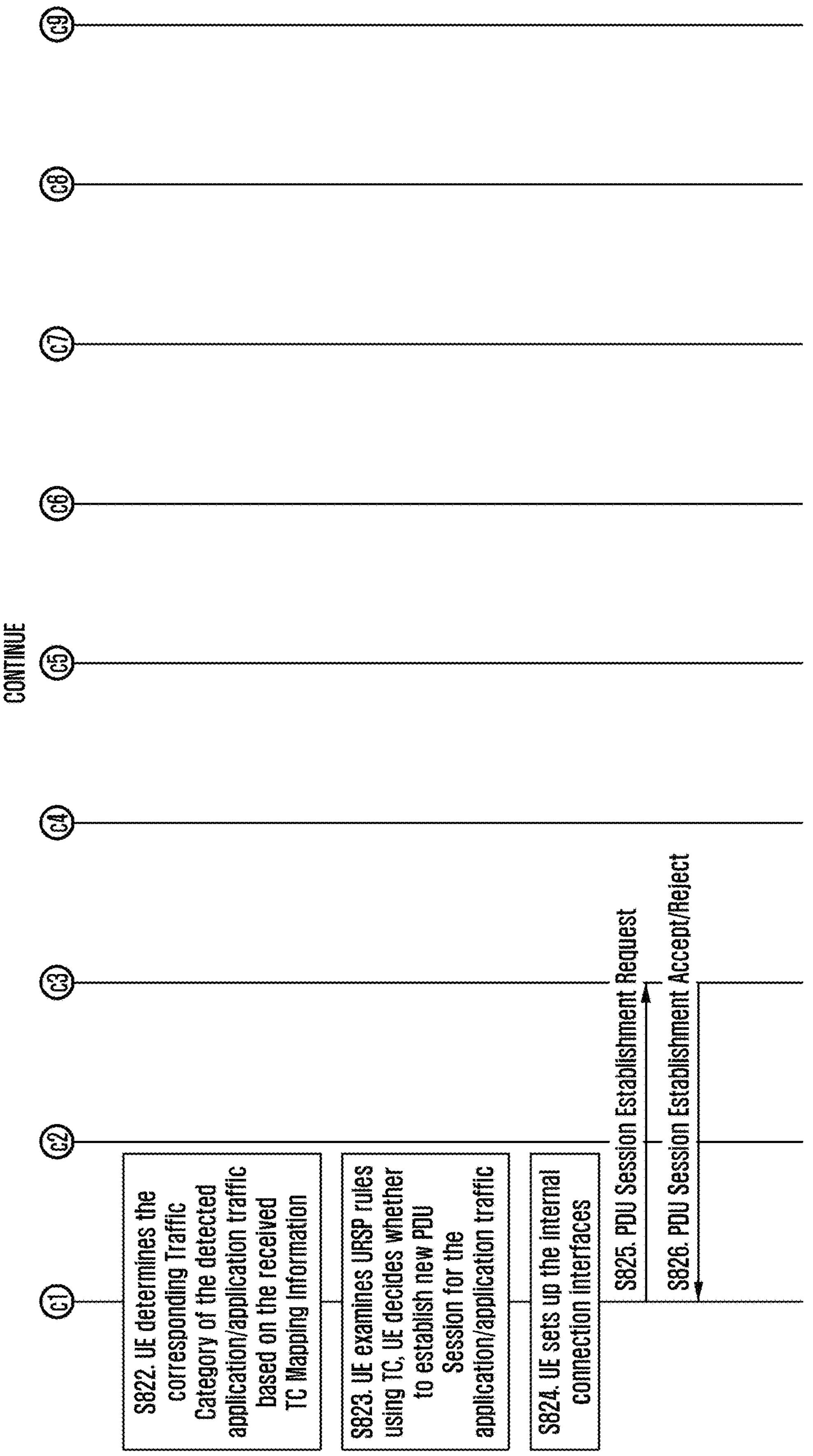

FIG. 7A and FIG. 7B are flowcharts illustrating a procedure of mapping a UE route selection policy in the wireless communication system according to the disclosure.

More specifically, FIG. 7A and FIG. 7B are diagrams for illustrating a method of mapping a UE route selection policy, based on traffic category mapping information determined by the network.

Operations illustrated in FIG. 7A and FIG. 7B correspond to the descriptions provided with reference to FIG. 6A and FIG. 6B. Operations not illustrated in FIG. 7A and FIG. 7B follow the descriptions of FIG. 6.

Operation S701: The UE 100 may transmit a registration request message to the AMF 300 via the (R)AN 200. The registration request message may include a traffic category support indication (hereinafter, TC support indication) indicating that the UE 100 is able to identify an application by using a traffic category. The AMF 300 may receive the registration request message from the UE 100 via the (R)AN 200. The TC support indication may be included in a UE policy container. The AMF 300 having received the registration request message including the TC support indication may continue to perform the remaining registration procedure.

Operation S702: When 5GC determines to accept the registration request of the UE 100, the registration acceptance may be transmitted to the UE 100 via the AMF 300. For example, the AMF 300 may transmit a registration acceptance message to the UE 100. The UE 100 may receive the registration acceptance message from the AMF 300.

Operation S703: The AMF 300 may request the PCF 600 to create UE policy association. The AMF 300 may transmit a UE policy associate create request message to the PCF 600. The PCF 600 may receive the UE policy associate create request message from the AMF 300. The UE policy associate create request message may include the TC support indication. In this case, the TC support indication may be included in the UE policy container. When the AMF 300 receives the UE policy container from the UE 100 in operation S701, the AMF 300 may transfer the same to the PCF 600. When the AMF 300 receives the TC support indication from the UE 100 separately or via the UE policy container in operation S701, the AMF 300 may transfer the same to the PCF 600. The AMF 300 may determine whether the UE 100 supports TC, based on subscription information, etc., and may transfer the TC support indication to the PCF 600.

Operation S704: The PCF 600 may request, from the UDR 910, information required to determine a UE policy. For example, the PCF 600 may transmit a DM query request message to the UDR 910. The UDR 910 may receive the DM query request message from the PCF 600. The DM query request message may include SUPI, policy data, and UE context policy control data. When the PCF 600 has received the TC support indication in operation S703 but is unable to determine whether the UE 100 supports TC, or has received the TC support indication but does not have TC mapping information for the UE 100, the PCF 600 may request the TC support indication and/or the TC mapping information from the UDR 910.

Operation S705: The UDR 910 may provide the TC support indication and/or the TC mapping information to the PCF 600. For example, the UDR 910 may transmit a DM query response message to the PCF 600. The PCF 600 may receive the DM query response message from the UDR 910. The DM query response message may include the TC support indication and/or the TC mapping information. The TC support indication and the TC mapping information may be provided as one piece of UE context policy control subscription information.

Operation S706: The PCF 600 may subscribe to TC support indication and/or TC mapping information so as to be notified by the UDR 910 about whether the UE 100 supports TC or a change related to TC mapping information applicable to the UE 100 when the change occurs. For example, the PCF 600 may transmit a DM subscription message to the UDR 910. The UDR 910 may receive the DM subscription message from the PCF 600. The DM subscription message may include policy data, SUPI, DNN, S-NSSAI, a notification target address, event reporting information, and UE context policy control data. The UE context policy control data may include the TC support indication and/or TC mapping information.

Operation S707: The PCF 600 may determine a URSP for the UE 100, and may determine, based on the TC mapping information, a URSP rule enabling application identification using TC. The TC mapping information for the UE 100 may be stored/configured in the PCF 600. The PCF 600 may request the TC mapping information from the UDR 910 as described in operation S704, and the PCF 600 may acquire and then store the same. The PCF 600 may generate new TC mapping information that is not identical to the previously stored/configured TC mapping information for the UE 100, and when determining the URSP for the UE 100, a URSP rule may be created based on the newly generated TC mapping information. For example, although the information of TC mapping information #1 31 in FIG. 3 has been previously stored/configured in the PCF 600, if it is determined that a change to the information of TC mapping information #2 32 in FIG. 3 is necessary, a new URSP may be determined based on TC mapping information #2 32. As another example, when the information of TC mapping information #1 31 in FIG. 3 has been previously stored/configured in the PCF 600, and after the URSP rules created based on TC mapping information #1 31 are provided to the UE 100 as in the method described in FIG. 6, if the PCF 600 determines that a change to TC mapping information #2 32 is necessary, a new URSP based on TC mapping information #2 32 may be determined and provided to the UE 100. In this case, the network may trigger procedures, such as UE policy association establishment, modification, and termination.

Operation S708: The PCF 600 may transmit a UE policy association create response message to the AMF 300. The AMF 300 may receive the UE policy association create response message from the PCF 600.

Operation S709: The PCF 600 may transmit the TC mapping information used in operation S707 and the URSP rules enabling application identification using TC to the UE 100 via the AMF 300 by using an N1N2message transfer message. For example, the PCF 600 may transmit the N1N2message transfer message to the AMF 300. The AMF 300 may receive the N1N2message transfer message from the PCF 600. The N1N2message transfer may include the UE policy container including the TC mapping information, and the URSP rules generated using the traffic category.

Operation S710: The AMF 300 may transfer, to the UE 100, the TC mapping information and the URSP rules enabling application identification using TC, which have been received from the PCF 600 in operation S709. For example, the AMF 300 may transmit a UE configuration update request message to the UE 100. The UE 100 may receive the UE configuration update request message from the AMF 300. The UE configuration update request message may include the UE policy container including the TC mapping information, and the URSP rules generated using the traffic category.

Operation S711: The UE 100 may store the UE policy received from the network in operation S710. For example, the UE policy may include the UE policy container including the TC mapping information, and the URSP rules generated using the traffic category.

Operation S712: The UE 100 may transmit a result of the UE policy transmission (e.g., success or failure) to the AMF 300. For example, the UE 100 may transmit a UE configuration response message to the AMF 300 via the (R)AN 200. The AMF 300 may receive the UE configuration update response message from the UE 100 via the (R)AN 200. The UE configuration update response message may include the UE policy container indicating the result of the UE policy transmission (e.g., success or failure).

Operation S713: The AMF 300 may transfer, to the PCF 600, the result of the UE policy transmission. For example, the AMF 300 may transmit an N1messageNotify message to the PCF 600. The PCF 600 may receive the N1messageNotify message from the AMF 300. The N1messageNotify message may include the UE policy container indicating the result of the UE policy transmission.

Operation S714: The UE 100 may detect an application or traffic of the application.

Operation S715: The UE 100 may determine a TC value corresponding to the detected application. In this case, the UE 100 may determine the value corresponding to the application, based on the TC mapping information received from the network in operation S710. The UE 100 may have the TC mapping information stored/configured before operation S710. If the two pieces of TC mapping information have different contents, the UE 100 may use more recent information, give priority to and apply the information provided from the network (information received in operation S710), or make a determination based on other configuration information of the UE or other requests received from the network. Alternatively, the UE 100 may ignore the TC mapping information previously stored/configured by the UE 100, and use only the information received from the network (information received in operation S710).

Operation S716: The UE 100 may examine, using the TC value determined in operation S715, the URSP rules enabling application identification using TC, which have been received in operation S710, so as to determine a URSP rule corresponding to the detected application, and may determine whether to establish a new PDU session for the detected application.

Operation S717: The UE 100 may configure an internal connection interface, etc. to transmit/receive application traffic via a PDU session, based on the URSP rule determined in operation S716.

Operation S718: When it is determined to establish a new PDU session for the application in operation S716, the UE 100 may transmit a PDU session establishment request to the network via the AMF 300. The network may perform the remaining procedure for PDU session establishment.

Operation S719: The network may determine whether to accept or make a determination on the PDU session establishment request, and may transmit acceptance or rejection for the PDU session establishment to the UE 100 via the AMF 300.

FIG. 8A to FIG. 8D are flowcharts illustrating a procedure of mapping a UE route selection policy in the wireless communication system according to the disclosure.

More specifically, FIG. 8A to FIG. 8D are diagrams for illustrating a method of mapping a UE route selection policy, based on traffic category mapping information determined by the application function.

Operations illustrated in FIG. 8A to FIG. 8D correspond to the descriptions provided with reference to FIG. 6A, FIG. 6B, FIG. 7A and FIG. 7B. Operations not illustrated in FIG. 8A to FIG. 8D follow the descriptions of FIG. 6A, FIG. 6B, FIG. 7A and FIG. 7B.

Operation S801: The UE 100 may transmit a registration request message to the AMF 300 via the (R)AN 200. The registration request message may include a traffic category support indication (hereinafter, TC support indication) indicating that the UE 100 is able to identify an application by using a traffic category. The AMF 300 may receive the registration request message from the UE 100 via the (R)AN 200. The TC support indication may be included in a UE policy container. The AMF 300 having received the registration request message including the TC support indication may continue to perform the remaining registration procedure.

Operation S802: When 5GC determines to accept the registration request of the UE 100, a registration acceptance message may be transmitted to the UE 100 via the AMF 300. The AMF 300 may transmit a registration acceptance message to the UE 100. The UE 100 may receive the registration acceptance message from the AMF 300.

Operation S803: The AMF 300 may request the PCF 600 to create UE policy association. For example, the AMF 300 may transmit a UE policy associate create request message to the PCF 600. The PCF 600 may receive the UE policy associate create request message from the AMF 300. The UE policy associate create request message may include the TC support indication. In this case, the TC support indication may be included in the UE policy container. When the AMF 300 receives the UE policy container from the UE 100 in operation S801, the AMF 300 may transfer the same to the PCF 600. When the AMF 300 receives the TC support indication from the UE 100 separately or via the UE policy container in operation S801, the AMF 300 may transfer the same to the PCF 600. The AMF 300 may determine whether the UE 100 supports TC, based on subscription information, etc., and may transfer the TC support indication to the PCF 600.

Operation S804: The PCF 600 may request, from the UDR 910, information required to determine a UE policy. For example, the PCF 600 may transmit a DM query request message to the UDR 910. The UDR 910 may receive the DM query request message from the PCF 600. The DM query request message may include SUPI, policy data, and UE context policy control data. When the PCF 600 has received the TC support indication in operation S803 but is unable to determine whether the UE 100 supports TC, or has received the TC support indication but does not have TC mapping information for the UE 100, the PCF 600 may request the TC support indication and/or the TC mapping information from the UDR 910.

Operation S805: The UDR 910 may provide the TC support indication and/or the TC mapping information to the PCF 600. For example, the UDR 910 may transmit a DM query response message to the PCF 600. The PCF 600 may receive the DM query response message from the UDR 910. The DM query response message may include the TC support indication and/or the TC mapping information. The TC support indication and the TC mapping information may be provided as one piece of UE context policy control subscription information.

Operation S806: The PCF 600 may subscribe to TC support indication and/or TC mapping information so as to be notified by the UDR 910 about whether the UE 100 supports TC or a change related to TC mapping information applicable to the UE 100 when the change occurs. For example, the PCF 600 may transmit a DM subscription message to the UDR 910. The UDR 910 may receive the DM subscription message from the PCF 600. The DM subscription message may include policy data, SUPI, DNN, S-NSSAI, a notification target address, event reporting information, and UE context policy control data. The UE context policy control data may include the TC support indication and/or TC mapping information.

Operation S807: The AF 700 may configure a TD using TC, based on the TC mapping information determined by the AF 700. The AF 700 may request the network to determine a URSP by applying the TD based on the TC mapping information determined by the AF 700.

Operation S808: The AF 700 may request, via the NEF 1300, the network to create, update, and/or delete service parameters. The service parameters for which the AF 700 requests creation/update/deletion may include the TC mapping information determined by the AF 700, which is used in operation S807, and the TD using TC, which is configured based on the TC mapping information. For example, the AF 700 may transmit a service parameter create, service parameter update, or service parameter delete message to the NEF 1300. The NEF 1300 may receive the service parameter create, service parameter update, or service parameter delete message from the AF 700. The service parameter create, service parameter update, or service parameter delete message may include a service parameter. The service parameters may include the traffic descriptor generated using the traffic category, and the TC mapping information.

Operation S809: The NEF 1300 may request authorization from the UDM 900 in response to the request of the AF 700 in operation S808. The NEF 1300 may provide the UDM 900 with service information including at least one of the TC mapping information determined by the AF 700 and received in operation S808, TDs using the TC, which are configured based on the TC mapping information, and TCs used in the TC mapping information determined by the AF 700. For example, the NEF 1300 may transmit a service specific authorization create request message to the UDM 900. The UDM 900 may receive the service specific authorization create request message from the NEF 1300. The service specific authorization create request message may include the service information. The service information may include the traffic category, the traffic descriptor generated using the traffic category, and the TC mapping information.

In operation S810, the UDM 900 determines whether the request of the AF 700 falls within a range allowed to a subscriber. For a specific example, the UDM 900 may determine whether to accept the request of the AF 700, by determining whether the TCs requested by the AF 700, the TC mapping information, and the TDs configured based on the TC mapping information include or request a service parameter (e.g., TC, network slice, DNN, PDU session type, SSC mode, access type, or the like) that is not allowed to the subscriber.

In operation S811, the UDM 900 may provide the NEF 1300 with authorization results for the request of the AF 700 in operation S810. For example, the UDM 900 may transmit a service specific authorization response message to the NEF 1300. The NEF 1300 may receive the service specific authorization response message from the UDM 900. The service specific authorization response message may indicate the authorization results for the traffic category, the traffic descriptor generated using the traffic category, and the TC mapping information.

In operation S812, the NEF 1300 may perform a procedure of, based on the results received in operation S811, storing the corresponding information in the UDR 910, or updating or deleting the existing information. For a specific example, when the TC mapping information requested by the AF 700 and the TD configured based on the TC mapping information are successfully authorized, the NEF 1300 may store the TC mapping information and the TD in the UDR 910.

In operation S813, the UDR 910 may provide the PCF 600 with the TD and the TC mapping information determined by the AF 700, which are recorded in operation S812. For example, the UDR 910 may transmit a DM notify message to the PCF 600. The PCF 600 may receive the DM notify message from the UDR 910. The DM notify message may include service parameters. The service parameters may include the traffic descriptor generated using the traffic category, and the TC mapping information.

Operation S814: The PCF 600 may determine a URSP for the UE 100, and may determine, based on the TC mapping information, a URSP rule enabling application identification using TC. The TC mapping information for the UE 100 may be stored/configured in the PCF 600. The PCF 600 may request the TC mapping information from the UDR 910 as described in operation S804, and the PCF 600 may acquire and then store the same. The PCF 600 may receive, in operation S813, the TC mapping information from the UDR 910 in response to the request of the AF 700. The PCF 600 may generate new TC mapping information that is not identical to the previously stored/configured TC mapping information for the UE 100, and when determining the URSP for the UE 100, a URSP rule may be created based on the newly generated TC mapping information. For example, although the information of TC mapping information #1 31 in FIG. 3 has been previously stored/configured in the PCF 600, if the information of TC mapping information #2 32 in FIG. 3 and TDs based thereon are received in operation S813, a new URSP may be determined based on the information received in operation S813. As another example, when the information of TC mapping information #1 31 in FIG. 3 has been previously stored/configured in the PCF 600, and after the URSP rules created based on TC mapping information #1 31 are provided to the UE 100 as in the methods described in FIG. 5 and FIG. 6, if the PCF 600 receives the information of TC mapping information #2 32 in FIG. 3 and TDs based thereon in operation S813, a new URSP based on TC mapping information #2 32 may be determined and provided to the UE 100. In this case, the network may trigger procedures, such as UE policy association establishment, modification, and termination.

Operation S815: The PCF 600 may transmit a UE policy association create response message to the AMF 300. The AMF 300 may receive the UE policy association create response message from the PCF 600.

Operation S816: The PCF 600 may use an N1N2message transfer message to transmit, to the UE 100 via the AMF 300, the TC mapping information used in operation S814 and URSP rules enabling application identification using TC. For example, the PCF 600 may transmit N1N2message transfer to the AMF 300. The AMF 300 may receive the N1N2message transfer from the PCF 600. The N1N2message transfer may include the UE policy container including the TC mapping information, and the URSP rules generated using the traffic category.

Operation S817: The AMF 300 may transfer, to the UE 100, the TC mapping information and the URSP rules enabling application identification using TC, which have been received from the PCF 600 in operation S816. For example, the AMF 300 may transmit a UE configuration update request message to the UE 100. The UE 100 may receive the UE configuration update request message from the AMF 300. The UE configuration update request message may include the UE policy container including the TC mapping information, and the URSP rules generated using the traffic category.

Operation S818: The UE 100 may store the UE policy received from the network in operation S810. For example, the UE policy may include the UE policy container including the TC mapping information, and the URSP rules generated using the traffic category.

Operation S819: The UE 100 may transmit a result of the UE policy transmission (e.g., success or failure) to the AMF 300. For example, the UE 100 may transmit a UE configuration update response message to the AMF 300 via the (R)AN 200. The AMF 300 may receive the UE configuration update response message from the UE 100 via the (R)AN 200. The UE configuration update response message may include the UE policy container indicating the result of the UE policy transmission (e.g., success or failure).

Operation S820: The AMF 300 may transfer, to the PCF 600, the result of the UE policy transmission. For example, the AMF 300 may transmit an N1messageNotify message to the PCF 600. The PCF 600 may receive the N1messageNotify message from the AMF 300. The N1messageNotify message may include the UE policy container indicating the result of the UE policy transmission.

Operation S821: The UE 100 may detect an application or traffic of the application.

Operation S822: The UE 100 may determine a TC value corresponding to the detected application. In this case, the UE 100 may determine the value corresponding to the application, based on the TC mapping information received from the network in operation S817. The UE 100 may have the TC mapping information stored/configured before operation S817. If the two pieces of TC mapping information have different contents, the UE 100 may use more recent information, give priority to and apply the information provided from the network (information received in operation S817), or make a determination based on other configuration information of the UE 100 or other requests received from the network. Alternatively, the UE 100 may ignore the TC mapping information previously stored/configured by the UE 100, and use only the information received from the network (information received in operation S817).

Operation S823: The UE 100 may examine, using the TC value determined in operation S815, the URSP rules enabling application identification using TC, which have been received in operation S810, so as to determine a URSP rule corresponding to the detected application, and may determine whether to establish a new PDU session for the detected application.

Operation S824: The UE 100 may configure an internal connection interface, etc. to transmit/receive application traffic via a PDU session, based on the URSP rule determined in operation S823.

Operation S825: When it is determined to establish a new PDU session for the application in operation S823, the UE 100 may transmit a PDU session establishment request to the network via the AMF 300. The network may perform the remaining procedure for PDU session establishment.

Operation S826: The network may determine whether to accept or make a determination on the PDU session establishment request, and may transmit acceptance or rejection for the PDU session establishment to the UE 100 via the AMF 300.

Figure 9:
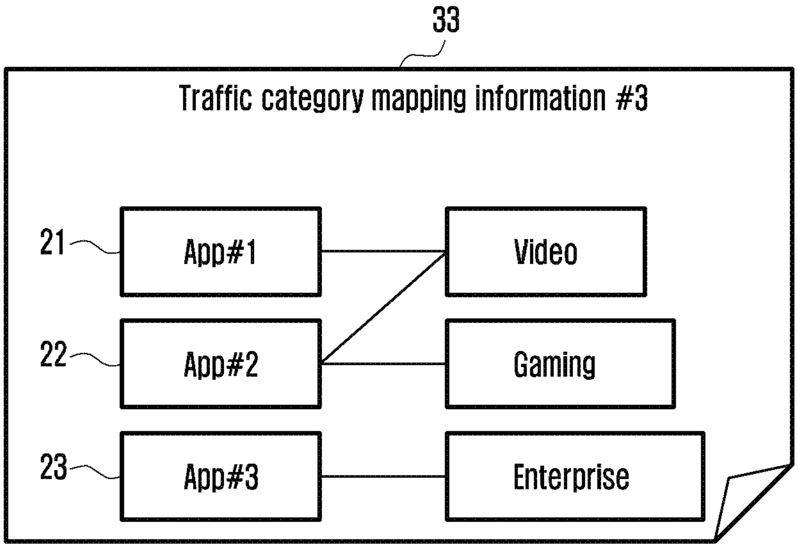
FIG. 9 is a conceptual diagram for illustrating a method of associating an application with a traffic category in the wireless communication system according to the disclosure.

FIG. 9 is a conceptual diagram for illustrating a method of associating an application with a traffic category in the wireless communication system according to the disclosure.

Referring to FIG. 9, as described in the description of FIG. 3, one application may use one or more traffic categories. For example, referring to traffic category mapping information #3 33, an application #1 21 may use video as a TC value, application #2 22 may use video and/or gaming as TC values, and application #3 23 may use enterprise as a TC value. This includes a case where application #2 22 may use one or more traffic categories, in which case, the network may determine to manage a PDU session according to a TC value for the same application, and to this end, a separate URSP rule may be determined according to TC value for one application. For example, URSP rule #1 for a video TC of application #2 may be defined, and URSP rule #2 for a gaming TC of application #2 may be defined separately. URSP rule #1 and URSP rule #2 may be distinguished by a combination of TC value and one or more pieces of matching criteria information of TD (as described in the description of FIG. 1). As described above, among the various methods for defining a URSP rule, a method of indicating an application to which a URSP rule should be matched may include a method of using APPID as in Table 1 or a method of using a corresponding TC based on traffic category mapping information as in Table 2. In addition, there may be a method of using a combination of TC value and one or more pieces of other TD matching criteria information as in Table 3 below.

TABLE 3

| URSP Rules using TC | | | | | | | | |
|---|---|---|---|---|---|---|---|---|
| | Traffic Descriptor (TD) APPID, TC, DNN, | | Route Selection Component (RSC) | | | | | |
| P | IP, FQDN, CC | P | S-NSSAI | DNN | SSC Mode | PDU-Type | Access-Type |
| 1 | TC = Video | 1 | S-NSSAI#1 | DNN#1 | SSC#3 | IPv4 | 3GPP |
| 2 | TC = Gaming, FQDN = app2-game-server.com | 1 | S-NSSAI#2 | DNN#2 | SSC#1 | IPv4/v6 | 3GPP |
| | | 2 | S-NSSAI#2 | DNN#2 | — | — | Non-3GPP |
| 3 | TC = Video, FQDN = app2-video-server.com | 1 | S-NSSAI#1 | DNN#1 | SSC#3 | IPv4 | 3GPP |
| 4 | TC = VideoCC = internet, supl | 1 | S-NSSAI#1 | DNN#1 | — | — | Non-3GPP |
| 5 | TC = EnterpriseCC = ims | 1 | S-NSSAI#3 | DNN#3 | — | — | Multi-Access |
| 6 | TC = Video | 1 | S-NSSAI#1 | DNN#1 | — | — | Multi-Access |
| 7 | * (match all) | 1 | S-NSSAI#4 | DNN#4 | SSC#3 | — | — |

Table 3 corresponds to an example of a method in which APPID of Table 1 is replaced using a domain descriptor in the TD matching criteria information along with the TC value. More specifically, the domain descriptor may provide a destination address of a server, and a FQDN is used in Table 3. Specifically, as in Table 1, the TD of the URSP rule for app #2 may include app #2 as APPID, and as in Table 2, replacement may be performed so that TC=Gaming, based on traffic category mapping information #1 or #2 in FIG. 3. If the network creates a URSP rule based on traffic category mapping information #3 of FIG. 9, the URSP rules for app #2 may be provided as two URSP rules distinguished by a combination of TC and FQDN, as in Table 3. For example, for the gaming TC, TC=Gaming and FQDN=app2-game-server.com may be provided, and for the video TC, TC=Video and FQDN=app2-video-server.com may be provided. A URSP rule including a TD using a combination of a TC value and one or more pieces of other TD matching criteria information may be applied in the same or similar manner to the method for PDU session management and application identification using the URSP rule to which TC has been applied, described in FIG. 4 to FIG. 8. Only the differences in the descriptions of the respective drawings are described below. Content that is the same as the description of each drawing may be omitted.

Figure 10:
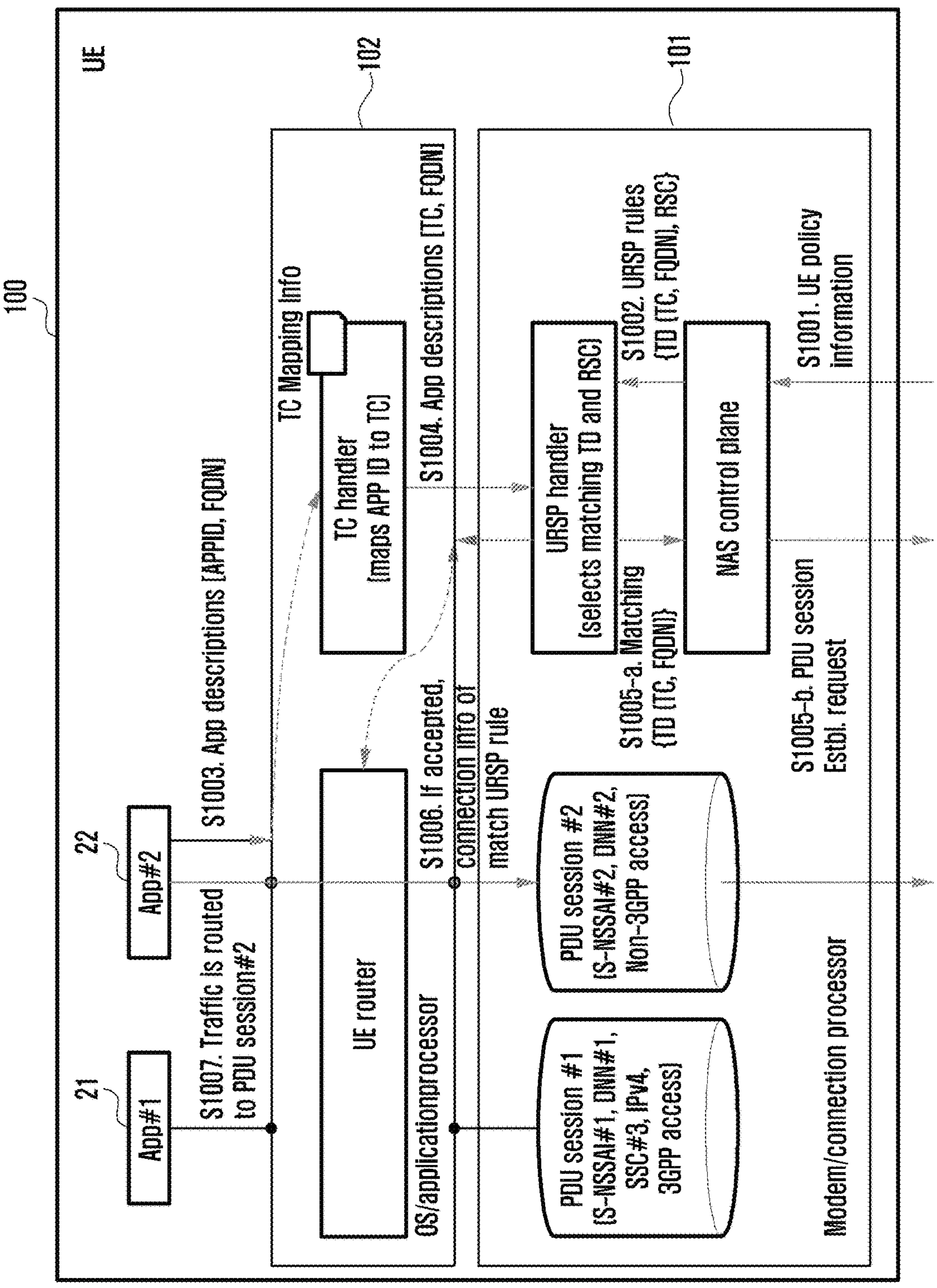
FIG. 10 is a conceptual diagram for illustrating a method in which, based on a URSP, the UE 100 associates an application with a PDU session in the wireless communication system according to the disclosure.

FIG. 10 is a conceptual diagram for illustrating a method in which, based on a URSP, the UE 100 associates an application with a PDU session in the wireless communication system according to the disclosure.

Operation S1001: The UE policy information received by the UE 100 may include a URSP rule including a TD using a combination of TC and FQDN.

Operation S1002: The URSP handler may identify the application 21 or 22 by using the combination of TC and FQDN.

Operation S1003: The application layer may provide, as information enabling identification of application traffic, an application identifier (APPID) and an address (FQDN) of a destination server, to which the traffic should be transmitted, to the TC handler of the OS. In the TC handler, traffic category mapping information may be stored/configured. The TC handler may map the combination of the application identifier and the server address to a traffic category, based on the traffic category mapping information that the TC handler has. For example, if the TC handler has information of content as in traffic category mapping information #3 in FIG. 9, but has detected an APPID value of appliction #2 22 and an FQDN for the gaming TC, the TC handler may map gaming to a TC value.

Operation S1004: The UE 100 may associate the detected traffic of the application 21 or 22 with a PDU session. As a specific example, the URSP handler may use the combination of the TC value and the FQDN, which is received from the TC handler in operation S403, to determine a TD matching a corresponding application traffic in the URSP rule received in operation S402, and may select an RSC applicable to the detected application 21 or 22 from among RSCs of the TD. In this case, determining of the TD matching the detected application 21 or 22 may correspond to a comparison method for identifying whether the same TC and FQDN values as the TC and FQDN values of the detected application 21 or 22 are included in the TD.

Operation S1005-*a*: The URSP handler may provide the NAS control plane with the determination on the URSP rule and PDU session association which are determined in operation in operation S1004, wherein the URSP rule determined in S1004 may correspond to a URSP rule determined based on whether the TC and FQDN values match.

Figure 11:
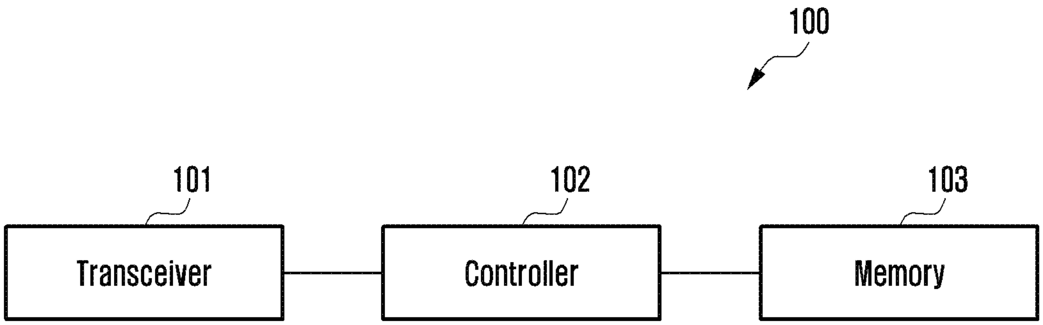
FIG. 11 is a block diagram illustrating a configuration of the UE 100 in the wireless communication system according to the disclosure.

FIG. 11 is a block diagram illustrating a configuration of the UE 100 in the wireless communication system according to the disclosure.

The UE 100 according to the disclosure may include a controller 102 configured to control overall operations of the UE 100, a transceiver 101 including a transmitter and a receiver, and a memory 103. Of course, the disclosure is not limited to the illustration, and the UE may include more or fewer elements than the elements illustrated in FIG. 11.

According to the disclosure, the transceiver 101 may transmit signals to and receive signals from network entities 200, 300, 600, 700, 900, 910, 1000, and 1300 or another UE. Signals transmitted to and received from the network entities 200, 300, 600, 700, 900, 910, 1000, and 1300 may include control information and data. In addition, the transceiver 101 may receive a signal via a radio channel, output the same to the controller 102, and transmit, through a radio channel, a signal output from the controller 102.

According to the disclosure, the controller 102 may control the UE 100 to perform the aforementioned operations of FIG. 2 to FIG. 10. The controller 102, the memory 103, and the transceiver 101 do not necessarily have to be implemented as separate modules, and may certainly be implemented as a single element unit in the form of a single chip. In addition, the controller 102 and the transceiver 101 may be electrically connected. In addition, the controller 102 may be an application processor (AP), a communication processor (CP), a circuit, an application-specific circuit, or at least one processor.

According to an embodiment of the disclosure, the memory 103 may store data, such as basic programs, application programs, and configuration information for operation of the UE 100. In particular, the memory 103 provides stored data in response to a request of the controller 102. The memory 103 may include storage media, such as a ROM, a RAM, a hard disk, a CD-ROM, and a DVD, or a combination of storage media. In addition, there may be multiple memories 103. In addition, the controller 102 may perform the aforementioned embodiments, based on programs for performing the aforementioned embodiments of the disclosure, which are stored in the memory 103.

Figure 12:
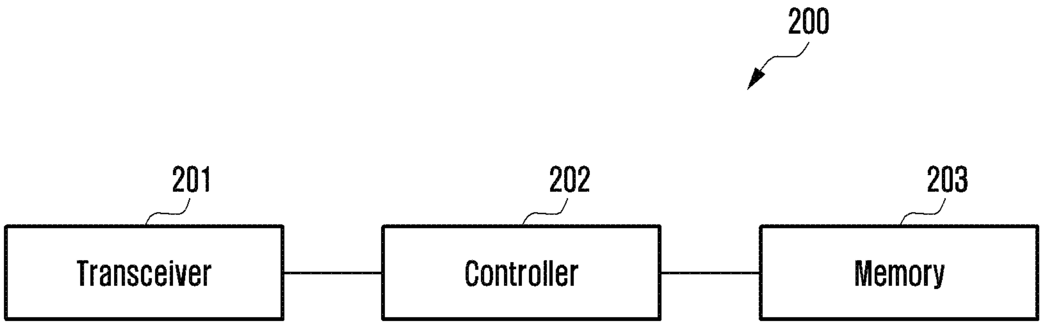
FIG. 12 is a block diagram illustrating a configuration of a (R)AN 200 in the wireless communication system according to the disclosure.

FIG. 12 is a block diagram illustrating a configuration of the (R)AN 200 in the wireless communication system according to the disclosure.

The (R)AN 200 according to the disclosure may include a controller 202 configured to control overall operations of the (R)AN 200, a transceiver 201 including a transmitter and a receiver, and a memory 203. Of course, the disclosure is not limited to the illustration, and the base station 200 may include more or fewer elements than the elements illustrated in FIG. 12.

According to the disclosure, the transceiver 201 may transmit signals to and receive signals from at least one of the UE 100 or other network entities 300, 600, 700, 900, 910, 1000, and 1300. Signals transmitted to and received from at least one of the UE 100 or other network entities 300, 600, 700, 900, 910, 1000, and 1300 may include control information and data.

According to the disclosure, the controller 202 may control the (R)AN 200 to perform the aforementioned operations of FIG. 2 to FIG. 10. The controller 202, the memory 203, and the transceiver 201 do not necessarily have to be implemented as separate modules, and may certainly be implemented as a single element unit in the form of a single chip. In addition, the controller 202 and the transceiver 201 may be electrically connected. In addition, the controller 202 may be an application processor (AP), a communication processor (CP), a circuit, an application-specific circuit, or at least one processor.

According to the disclosure, the memory 203 may store data, such as basic programs, application programs, and configuration information for operation of the (R)AN 200. In particular, the memory 203 provides stored data in response to a request of the controller 202. The memory 203 may include storage media, such as a ROM, a RAM, a hard disk, a CD-ROM, and a DVD, or a combination of storage media. In addition, there may be multiple memories 203. In addition, the controller 202 may perform the aforementioned embodiments, based on programs for performing the aforementioned embodiments of the disclosure, which are stored in the memory 203.

Figure 13:
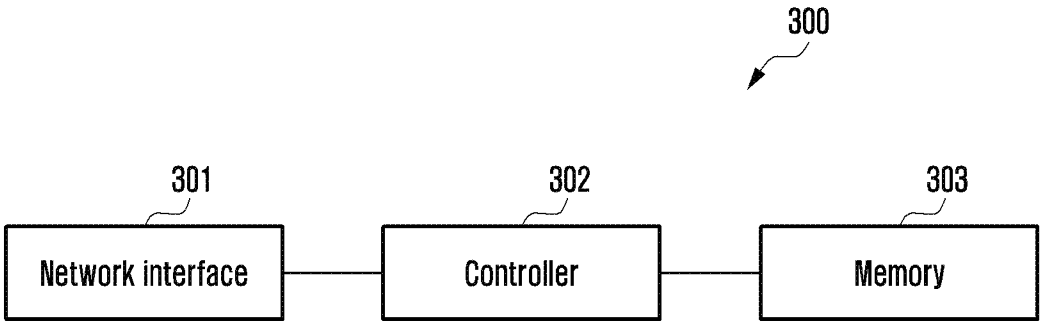
FIG. 13 is a block diagram illustrating a configuration of an AMF 300 in the wireless communication system according to the disclosure.

FIG. 13 is a block diagram illustrating a configuration of the AMF 300 in the wireless communication system according to the disclosure.

The AMF 300 according to the disclosure may include a controller 302 configured to control overall operations of the AMF 300, a network interface 301 including a transmitter and a receiver, and a memory 303. Of course, the disclosure is not limited to the illustration, and the AMF 300 may include more or fewer elements than the elements illustrated in FIG. 13.

According to the disclosure, the network interface 301 may transmit signals to and receive signals from at least one of the UE 100 or other network entities 200, 600, 700, 900, 910, 1000, and 1300. Signals transmitted to and received from at least one of the UE 100 or other network entities 200, 600, 700, 900, 910, 1000, and 1300 may include control information and data.

According to the disclosure, the controller 302 may control the AMF 300 to perform the aforementioned operations of FIG. 2 to FIG. 10. The controller 302, the memory 303, and the network interface 301 do not necessarily have to be implemented as separate modules, and may certainly be implemented as a single element unit in the form of a single chip. In addition, the controller 302 and the network interface 301 may be electrically connected. In addition, the controller 302 may be an application processor (AP), a communication processor (CP), a circuit, an application-specific circuit, or at least one processor.

According to the disclosure, the memory 303 may store data, such as basic programs, application programs, and configuration information for operation of the AMF 300. In particular, the memory 303 provides stored data in response to a request of the controller 302. The memory 303 may include storage media, such as a ROM, a RAM, a hard disk, a CD-ROM, and a DVD, or a combination of storage media. In addition, there may be multiple memories 303. In addition, the controller 302 may perform the aforementioned embodiments, based on programs for performing the aforementioned embodiments of the disclosure, which are stored in the memory 303.

Figure 14:
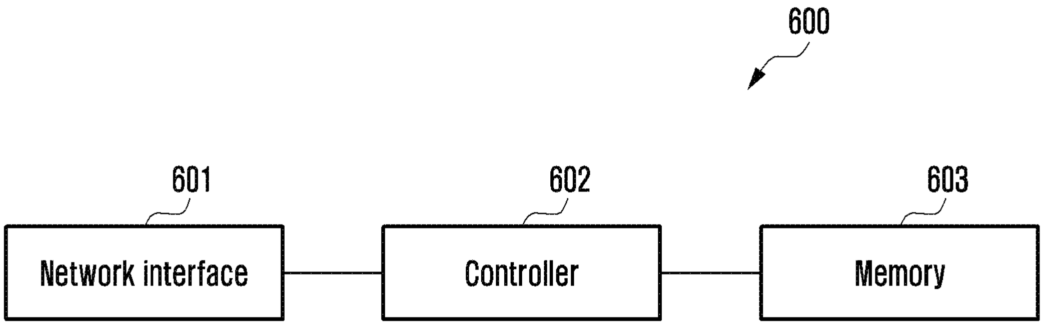
FIG. 14 is a block diagram illustrating a configuration of a PCF 600 in the wireless communication system according to the disclosure.

FIG. 14 is a block diagram illustrating a configuration of the PCF 600 in the wireless communication system according to the disclosure.

The PCF 600 according to the disclosure may include a controller 602 configured to control overall operations of the PCF 600, a network interface 601 including a transmitter and a receiver, and a memory 603. Of course, the disclosure is not limited to the illustration, and the PCF 600 may include more or fewer elements than the elements illustrated in FIG. 14.

According to the disclosure, the network interface 601 may transmit signals to and receive signals from at least one of the UE 100 or other network entities 200, 300, 700, 900, 910, 1000, and 1300. Signals transmitted to and received from at least one of the UE 100 or other network entities 200, 300, 700, 900, 910, 1000, and 1300 may include control information and data.

According to the disclosure, the controller 602 may control the PCF 600 to perform the aforementioned operations of FIG. 2 to FIG. 10. The controller 602, the memory 603, and the network interface 601 do not necessarily have to be implemented as separate modules, and may certainly be implemented as a single element unit in the form of a single chip. In addition, the controller 602 and the network interface 701 may be electrically connected. In addition, the controller 602 may be an application processor (AP), a communication processor (CP), a circuit, an application-specific circuit, or at least one processor.

According to the disclosure, the memory 603 may store data, such as basic programs, application programs, and configuration information for operation of the PCF 600. In particular, the memory 603 provides stored data in response to a request of the controller 602. The memory 603 may include storage media, such as a ROM, a RAM, a hard disk, a CD-ROM, and a DVD, or a combination of storage media. In addition, there may be multiple memories 603. In addition, the controller 602 may perform the aforementioned embodiments, based on programs for performing the aforementioned embodiments of the disclosure, which are stored in the memory 603.

Figure 15:
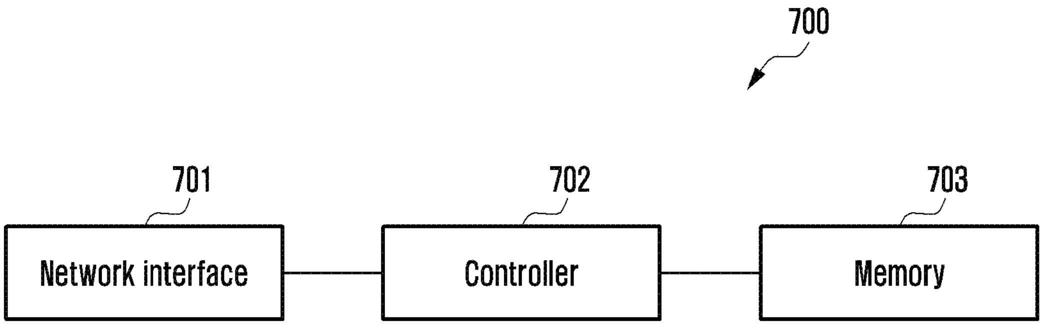
FIG. 15 is a block diagram illustrating a configuration of an AF 700 in the wireless communication system according to the disclosure.

FIG. 15 is a block diagram illustrating a configuration of the AF 700 in the wireless communication system according to the disclosure.

The AF 700 according to the disclosure may include a controller 702 configured to control overall operations of the AF 700, a network interface 701 including a transmitter and a receiver, and a memory 703. Of course, the disclosure is not limited to the illustration, and the AF 700 may include more or fewer elements than the elements illustrated in FIG. 13.

According to the disclosure, the network interface 701 may transmit signals to and receive signals from at least one of the UE 100 or other network entities 200, 300, 600, 900, 910, 1000, and 1300. Signals transmitted to and received from at least one of the UE 100 or other network entities 200, 300, 600, 900, 910, 1000, and 1300 may include control information and data.

According to the disclosure, the controller 702 may control the AF 700 to perform the aforementioned operations of FIG. 2 to FIG. 10. The controller 702, the memory 703, and the network interface 701 do not necessarily have to be implemented as separate modules, and may certainly be implemented as a single element unit in the form of a single chip. In addition, the controller 702 and the network interface 701 may be electrically connected. In addition, the controller 1002 may be an application processor (AP), a communication processor (CP), a circuit, an application-specific circuit, or at least one processor.

According to the disclosure, the memory 703 may store data, such as basic programs, application programs, and configuration information for operation of the AF 700. In particular, the memory 703 provides stored data in response to a request of the controller 702. The memory 703 may include storage media, such as a ROM, a RAM, a hard disk, a CD-ROM, and a DVD, or a combination of storage media. In addition, there may be multiple memories 703. In addition, the controller 702 may perform the aforementioned embodiments, based on programs for performing the aforementioned embodiments of the disclosure, which are stored in the memory 703.

Figure 16:
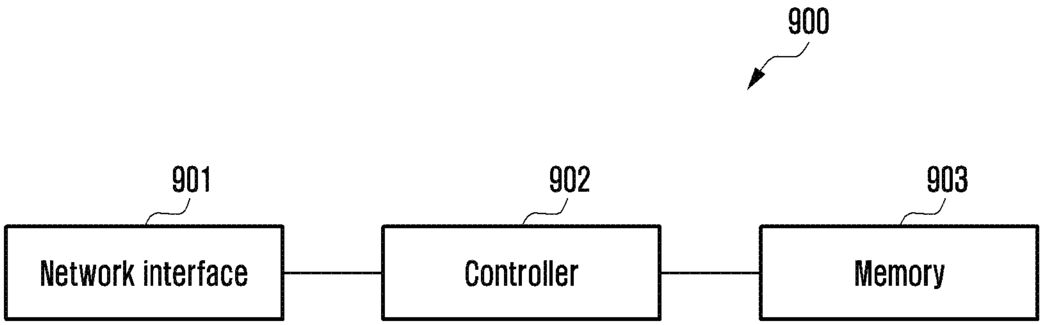
FIG. 16 is a block diagram illustrating a configuration of a UDM 900 in the wireless communication system according to the disclosure.

FIG. 16 is a block diagram illustrating a configuration of the UDM 900 in the wireless communication system according to the disclosure.

The UDM 900 according to the disclosure may include a controller 902 configured to control overall operations of the UDM 900, a network interface 901 including a transmitter and a receiver, and a memory 903. Of course, the disclosure is not limited to the illustration, and the UDM 900 may include more or fewer elements than the elements illustrated in FIG. 16.

According to the disclosure, the network interface 901 may transmit signals to and receive signals from at least one of the UE 100 or other network entities 200, 300, 600, 700, 910, 1000, and 1300. Signals transmitted to and received from at least one of the UE 100 or other network entities 200, 300, 600, 700, 910, 1000, and 1300 may include control information and data.

According to the disclosure, the controller 902 may control the UDM 900 to perform the aforementioned operations of FIG. 2 to FIG. 10. The controller 902, the memory 903, and the network interface 901 do not necessarily have to be implemented as separate modules, and may certainly be implemented as a single element unit in the form of a single chip. In addition, the controller 902 and the network interface 901 may be electrically connected. In addition, the controller 902 may be an application processor (AP), a communication processor (CP), a circuit, an application-specific circuit, or at least one processor.

According to the disclosure, the memory 903 may store data, such as basic programs, application programs, and configuration information for operation of the UDM 900. In particular, the memory 903 provides stored data in response to a request of the controller 902. The memory 903 may include storage media, such as a ROM, a RAM, a hard disk, a CD-ROM, and a DVD, or a combination of storage media. In addition, there may be multiple memories 903. In addition, the controller 902 may perform the aforementioned embodiments, based on programs for performing the aforementioned embodiments of the disclosure, which are stored in the memory 903.

Figure 17:
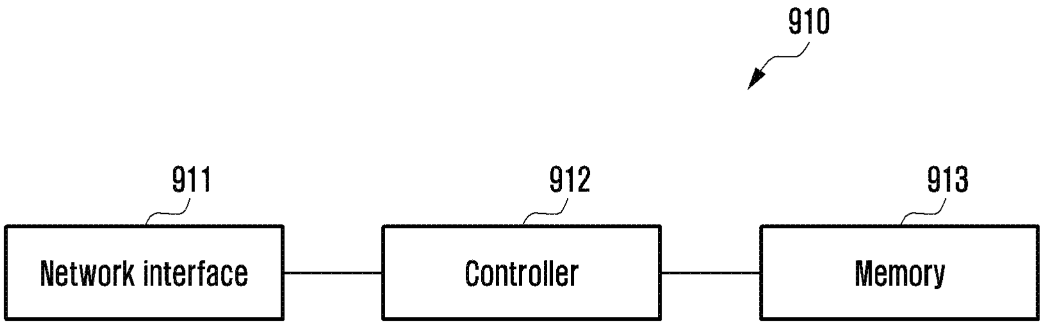
FIG. 17 is a block diagram illustrating a configuration of a UDR 900 in the wireless communication system according to the disclosure.

FIG. 17 is a block diagram illustrating a configuration of the UDR 910 in the wireless communication system according to the disclosure.

The UDR 910 according to the disclosure may include a controller 912 configured to control overall operations of the UDR 910, a network interface 911 including a transmitter and a receiver, and a memory 913. Of course, the disclosure is not limited to the illustration, and the UDR 910 may include more or fewer elements than the elements illustrated in FIG. 17.

According to the disclosure, the network interface 911 may transmit signals to and receive signals from at least one of the UE 100 or other network entities 200, 300, 600, 700, 900, 1000, and 1300. Signals transmitted to and received from at least one of the UE 100 or other network entities 200, 300, 600, 700, 900, 1000, and 1300 may include control information and data.

According to the disclosure, the controller 912 may control the UDR 910 to perform the aforementioned operations of FIG. 2 to FIG. 10. The controller 912, the memory 913, and the network interface 911 do not necessarily have to be implemented as separate modules, and may certainly be implemented as a single element unit in the form of a single chip. In addition, the controller 912 and the network interface 911 may be electrically connected. In addition, the controller 912 may be an application processor (AP), a communication processor (CP), a circuit, an application-specific circuit, or at least one processor.

According to the disclosure, the memory 913 may store data, such as basic programs, application programs, and configuration information for operation of the UDR 910. In particular, the memory 913 provides stored data in response to a request of the controller 912. The memory 913 may include storage media, such as a ROM, a RAM, a hard disk, a CD-ROM, and a DVD, or a combination of storage media. In addition, there may be multiple memories 913. In addition, the controller 912 may perform the aforementioned embodiments, based on programs for performing the aforementioned embodiments of the disclosure, which are stored in the memory 913.

Figure 18:
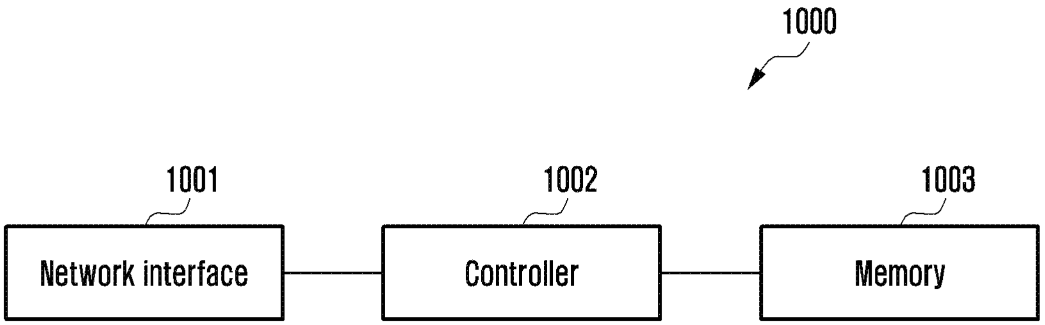
FIG. 18 is a block diagram illustrating a configuration of a DN 1000 in the wireless communication system according to the disclosure.

FIG. 18 is a block diagram illustrating a configuration of the DN 1000 in the wireless communication system according to the disclosure.

The DN 1000 according to the disclosure may include a controller 1002 configured to control overall operations of the DN 1000, a network interface 1001 including a transmitter and a receiver, and a memory 1003. Of course, the disclosure is not limited to the illustration, and the DN 1000 may include more or fewer elements than the elements illustrated in FIG. 18.

According to the disclosure, the network interface 1001 may transmit signals to and receive signals from at least one of the UE 100 or other network entities 200, 300, 600, 700, 900, 910, and 1300. Signals transmitted to and received from at least one of the UE 100 or other network entities 200, 300, 600, 700, 900, 910, and 1300 may include control information and data.

According to the disclosure, the controller 1002 may control the DN 1000 to perform the aforementioned operations of FIG. 2 to FIG. 10. The controller 1002, the memory 1003, and the network interface 1001 do not necessarily have to be implemented as separate modules, and may certainly be implemented as a single element unit in the form of a single chip. In addition, the controller 1002 and the network interface 1001 may be electrically connected. In addition, the controller 1002 may be an application processor (AP), a communication processor (CP), a circuit, an application-specific circuit, or at least one processor.

According to the disclosure, the memory 1003 may store data, such as basic programs, application programs, and configuration information for operation of the DN 1000. In particular, the memory 1003 provides stored data in response to a request of the controller 1002. The memory 1003 may include storage media, such as a ROM, a RAM, a hard disk, a CD-ROM, and a DVD, or a combination of storage media. In addition, there may be multiple memories 1003. In addition, the controller 1002 may perform the aforementioned embodiments, based on programs for performing the aforementioned embodiments of the disclosure, which are stored in the memory 1003.

Figure 19:
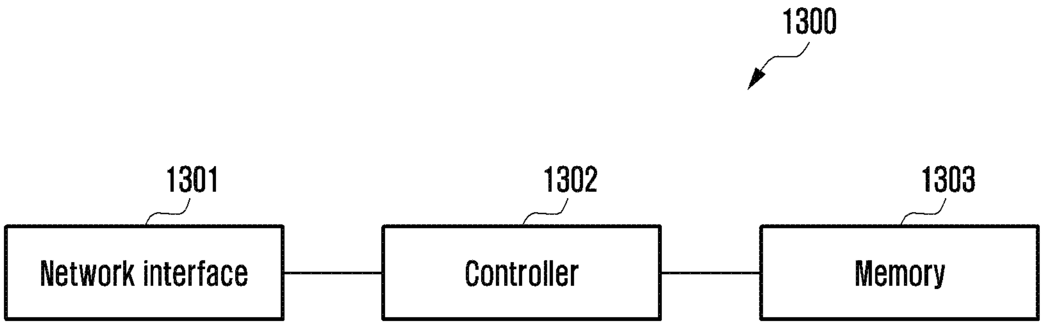
FIG. 19 is a block diagram illustrating a configuration of an NEF 1300 in the wireless communication system according to the disclosure.

FIG. 19 is a block diagram illustrating a configuration of the NEF 1300 in the wireless communication system according to the disclosure.

The NEF 1300 according to the disclosure may include a controller 1302 configured to control overall operations of the NEF 1300, a network interface 1301 including a transmitter and a receiver, and a memory 1303. Of course, the disclosure is not limited to the illustration, and the NEF 1300 may include more or fewer elements than the elements illustrated in FIG. 19.

According to the disclosure, the network interface 1301 may transmit signals to and receive signals from at least one of the UE 100 or other network entities 200, 300, 600, 700, 900, 910, and 1000. Signals transmitted to and received from at least one of the UE 100 or other network entities 200, 300, 600, 700, 900, 910, and 1000 may include control information and data.

According to the disclosure, the controller 1302 may control the NEF 1300 to perform the aforementioned operations of FIG. 2 to FIG. 10. The controller 1302, the memory 1303, and the network interface 1301 do not necessarily have to be implemented as separate modules, and may certainly be implemented as a single element unit in the form of a single chip. In addition, the controller 1302 and the network interface 1001 may be electrically connected. In addition, the controller 1302 may be an application processor (AP), a communication processor (CP), a circuit, an application-specific circuit, or at least one processor.

According to the disclosure, the memory 1303 may store data, such as basic programs, application programs, and configuration information for operation of the NEF 1300. In particular, the memory 1303 provides stored data in response to a request of the controller 1302. The memory 1303 may include storage media, such as a ROM, a RAM, a hard disk, a CD-ROM, and a DVD, or a combination of storage media. In addition, there may be multiple memories 1303. In addition, the controller 1302 may perform the aforementioned embodiments, based on programs for performing the aforementioned embodiments of the disclosure, which are stored in the memory 1303.

The embodiments of the disclosure described and shown in the specification and the drawings are merely particular examples that have been presented to easily explain the technical contents of the disclosure and help understanding of the disclosure, and are not intended to limit the scope of the disclosure. Therefore, the scope of the disclosure should be construed to include, in addition to the embodiments set forth herein, all changes and modifications derived based on the technical idea of the disclosure.

INDUSTRIAL APPLICABILITY

The disclosure can be used in the electronics industry and the information communication industry.

The invention claimed is:

1. An operation method of a user equipment (UE) in a wireless communication system, the method comprising:

transmitting a registration request message comprising a traffic category support indication to an access and mobility management function (AMF) via an access node;

receiving, from the AMF via the access node, a UE configuration update message comprising UE route selection policy (URSP) rules determined based on the traffic category support indication and first traffic category mapping information; and determining a protocol data unit (PDU) session for application traffic, based on the URSP rules and pre-stored second traffic category mapping information.

2. The method of claim 1, wherein, in response to the registration request message, a UE policy associate create request message comprising the traffic category support indication is transmitted from the AMF to a PCF.

3. The method of claim 2, wherein, in response to the UE policy associate create request message, a DM query request message is transmitted from the PCF to a UDR, and wherein, in response to the DM query request message, a DM query response message comprising the first traffic category mapping information is transmitted from the UDR to the PCF.

4. The method of claim 3, wherein, in response to the DM query response message, a DM subscription message comprising the traffic category support indication and the first traffic category mapping information is transmitted from the PCF to the UDR.

5. The method of claim 4, wherein the URSP rules are determined by the PCF, based on the first traffic category mapping information.

6. The method of claim 5, wherein an N1N2message transfer message comprising the URSP rules is transmitted from the PCF to the AMF.

7. The method of claim 6, wherein the UE configuration update message is received from the AMF via the access node in response to the N1N2message transfer message.

8. The method of claim 1, wherein the determining of the PDU session comprises:

storing the URSP rules; and detecting the application traffic.

9. The method of claim 8, wherein the determining of the PDU session further comprises determining a traffic category corresponding to the detected application traffic, based on the pre-stored second traffic category mapping information.

10. The method of claim 9, wherein the determining of the PDU session further comprises:

determining at least one URSP rule corresponding to the determined traffic category, based on the URSP rules; and determining an internal connection interface and the PDU session for the application traffic, based on the at least one URSP rule.

11. The method of claim 1, further comprising:

transmitting, to the AMF via the access node, a request message for requesting establishment of the PDU session; and receiving a response message to the request message from the AMF via the access node.

12. The method of claim 1, wherein the traffic category support indication indicates that the UE detects at least one application traffic, based on a traffic category indicated by at least one of the first traffic category mapping information and the pre-stored second traffic category mapping information.

13. The method of claim 1, wherein the first traffic category mapping information is determined by a PCF based on network configuration information, is transmitted from the PCF to the AMF, and indicates a route selection component (RSC) and an application corresponding to each of multiple traffic categories.

14. The method of claim 1, wherein the pre-stored second traffic category mapping information is determined by the UE, based on UE configuration information received from the AMF via the access node, and indicates a route selection component and an application corresponding to each of multiple traffic categories.

15. An operation method of a user equipment (UE) in a wireless communication system, the method comprising:

transmitting a registration request message comprising a traffic category support indication to an access and mobility management function (AMF) via an access node;

receiving, from the AMF via the access node, a UE configuration update message comprising traffic category mapping information and UE route selection policy (URSP) rules determined based on the traffic category support indication; and determining a protocol data unit (PDU) session for application traffic, based on the URSP rules and the traffic category mapping information.

* * * * *